(12) United States Patent
Kiuchi et al.

(10) Patent No.: US 10,799,956 B2
(45) Date of Patent: Oct. 13, 2020

(54) INDEXABLE ROTARY CUTTING TOOL AND INSERT

(71) Applicant: Mitsubishi Hitachi Tool Engineering, Ltd., Tokyo (JP)

(72) Inventors: Yasuhiro Kiuchi, Narita (JP); Yoshiyuki Kobayashi, Narita (JP); Takao Nakamigawa, Narita (JP); Fumihiko Inagaki, Narita (JP); Yuuki Hayashi, Narita (JP)

(73) Assignee: Mitsubishi Hitachi Tool Engineering, Ltd., Tokyo (JP)

( * ) Notice: Subject to any disclaimer, the term of this patent is extended or adjusted under 35 U.S.C. 154(b) by 345 days.

(21) Appl. No.: 15/776,209

(22) PCT Filed: Aug. 19, 2016

(86) PCT No.: PCT/JP2016/074240
§ 371 (c)(1),
(2) Date: May 15, 2018

(87) PCT Pub. No.: WO2017/085975
PCT Pub. Date: May 26, 2017

(65) Prior Publication Data
US 2020/0254529 A1    Aug. 13, 2020

(30) Foreign Application Priority Data
Nov. 16, 2015 (JP) ................. 2015-223958

(51) Int. Cl.
*B23C 5/10* (2006.01)
*B23C 5/20* (2006.01)
*B23B 27/16* (2006.01)

(52) U.S. Cl.
CPC ...... *B23B 27/1603* (2013.01); *B23B 2200/08* (2013.01); *B23C 5/109* (2013.01); *B23C 5/20* (2013.01); *B23C 2200/283* (2013.01)

(58) Field of Classification Search
CPC ........ B23C 2210/50; B23C 2210/0442; B23C 2210/503; B23C 2210/74;
(Continued)

(56) References Cited

U.S. PATENT DOCUMENTS 6,846,135 B2    1/2005  Kuroda et al.
8,882,406 B2 *  11/2014  Hobohm ................... B23C 5/10
                                                           407/53
(Continued)

FOREIGN PATENT DOCUMENTS

CN    102266975 A    12/2011
CN    102717138 A    10/2012
(Continued)

OTHER PUBLICATIONS

International Search Report dated Sep. 13, 2016, issued for PCT/JP2016/074240 and English translation thereof.
(Continued)

*Primary Examiner* — Nicole N Ramos
(74) *Attorney, Agent, or Firm* — Locke Lord LLP

(57) ABSTRACT

In an indexable rotary cutting tool of the present invention, a cutting edge portion of an insert includes a peripheral cutting edge, a bottom cutting edge, a cutting edge of a corner R, and a chamfered surface, a radial rake angle (δ) of the cutting edge of the corner R has a negative value in an entire edge length region of the cutting edge of the corner R, and the radial rake angle (δ) becomes a minimum value at an intermediate portion located between a pair of boundary points (P, Q) in the cutting edge of the corner R.

8 Claims, 14 Drawing Sheets

(58) Field of Classification Search
CPC ........ B23C 2200/203; B23C 2200/283; B23C 2200/086; B23C 2200/326; B23C 5/109; B23C 5/20; B23C 5/02; B23C 5/10; B23B 27/1603; B23B 2200/08
See application file for complete search history.

(56) References Cited

U.S. PATENT DOCUMENTS

| | | | | |
|---|---|---|---|---|
| 2005/0025584 | A1* | 2/2005 | Kolker | B23C 5/10 407/54 |
| 2006/0060053 | A1* | 3/2006 | Tanaka | B23C 5/1036 83/663 |
| 2006/0093445 | A1* | 5/2006 | Tsuchitani | B23C 5/1036 407/54 |
| 2011/0008112 | A1 | 1/2011 | Abe | |
| 2015/0258617 | A1* | 9/2015 | Kiuchi | B23C 5/1036 407/42 |
| 2019/0047062 | A1* | 2/2019 | Kiuchi | B23C 5/109 |

FOREIGN PATENT DOCUMENTS

| | | |
|---|---|---|
| CN | 101977714 B | 11/2012 |
| CN | 103203492 A | 7/2013 |
| CN | 103857487 A | 6/2014 |
| CN | 103962590 A | 8/2014 |
| CN | 104169030 A | 11/2014 |
| EP | 2258505 A1 | 12/2010 |
| JP | 08-281513 A | 10/1996 |
| JP | 2003-071626 A | 3/2003 |
| JP | 2004-050338 A | 2/2004 |
| JP | 2011-020192 A | 2/2011 |
| JP | 5267556 B2 | 8/2013 |
| JP | 2015-000467 A | 1/2015 |
| JP | 5744235 B2 | 7/2015 |
| KR | 20-0469788 Y1 | 11/2013 |
| WO | 2009/123192 A1 | 10/2009 |

OTHER PUBLICATIONS

Office Action dated Jan. 2, 2019, issued for the Chinese patent application No. 201680066026.3 and a partial English translation of the search report.
Supplementary European Search Report dated Jun. 14, 2019, issued for the European patent application No. 16865978.7.

* cited by examiner

US 10,799,956 B2

INDEXABLE ROTARY CUTTING TOOL AND INSERT

TECHNICAL FIELD

The present invention relates to an indexable rotary cutting tool to which an insert used for cutting and suitable for finish machining on a side surface of a workpiece is attached, and an insert.

Priority is claimed on Japanese Patent Application No. 2015-223958, filed Nov. 16, 2015, the content of which is incorporated herein by reference.

BACKGROUND ART

In the case of finish machining a bottom surface corresponding to a processing reference surface or a side surface perpendicular to a horizontal plane in a workpiece such as a mold, a square type solid end mill is conventionally used. However, in machining with a long tool protrusion length (L/D is 4 or more), it may be difficult to obtain machining accuracy due to the tilting of a tool. Regarding "L/D", the L value indicates the length of the tool in the direction of the rotation center axis and the D value indicates the diameter of the rotation trajectory of the tool cutting edge.

In the solid type, for example, the tool itself is very expensive in the case of a size of the outer diameter of φ10 mm or more. For this reason, an indexable radius end mill is used for machining in which the tool protrusion length is long (L/D is 4 or more). In order to obtain machining accuracy, it is necessary to perform machining by decreasing cutting conditions so that chattering vibration is reduced and chipping or fracture on the cutting edge does not occur. For example, the term "decreasing the cutting conditions" means that cutting conditions such as a cutting amount and a feeding amount are reduced to being as small as possible.

For this reason, there are various proposals for the cutting edge shape of an indexable radius end mill.

Patent Literature 1 (Japanese Unexamined Patent Application, First Publication No Hei 8-281513) discloses an indexable end mill capable of sandwiching an insert such that it is attachable and detachable by a V-shaped slit of a front end part of a tool body, wherein a cutting edge tip includes a peripheral cutting edge which is formed in the axial direction from an apex angle of the tool body, a bottom edge which is located in a direction substantially perpendicular to the peripheral cutting edge, and a cutting edge at a corner R which is formed in a substantially quarter arc shape at a bottom edge corner to contact the peripheral cutting edge and the bottom edge, and wherein a gash angle of the bottom edge is set to 30 to 45° and a non-gash portion having a width of 0.1 to 1 mm and parallel to the peripheral cutting edge is provided.

Patent Literature 2 (Japanese Patent No. 5744235) discloses a radius end mill provided with a bottom cutting edge existing at a front end part of a tool body and a peripheral cutting edge existing at the outer periphery of the tool body, wherein the bottom cutting edge and the peripheral cutting edge are connected to each other by a cutting edge of a corner R, a chip discharge groove is provided at the rear side of a rake face of the peripheral cutting edge, and a corner gash is formed adjacent to the cutting edge of the corner R. Then, as disclosed in Patent Literature 2, a part of the edge of the corner gash is provided on the cutting edge of the corner R other than a boundary between the cutting edge of the corner R and the bottom cutting edge and a boundary between the cutting edge of the corner R and the peripheral cutting edge and an axial rake at an end portion on the side of the bottom cutting edge contacting the corner gash is set to 5 to 20°.

In a radius end mill disclosed in Patent Literature 3 (Japanese Patent No. 5267556), a wall surface facing an end mill rotation direction of a gash provided at a front end part of a chip discharge groove or a chip discharge groove provided at the outer periphery of a front end part of an end mill main body becomes a rake face, a tip side of the rake face becomes a bottom cutting edge, an outer peripheral side becomes a peripheral cutting edge, a corner edge connecting the bottom cutting edge to the peripheral cutting edge includes a protruding arc-shaped corner edge, the corner edge has a positive cutting edge tilting angle, and the cutting edge at the ridge side of the rake face is formed in a twisted surface shape which is tilted backward in the end mill rotation direction as it goes from the bottom edge side toward the peripheral cutting edge side and the backward inclination in the end mill rotation direction gradually increases as it goes from the corner edge toward a center of a protruding arc formed by the corner edge.

Patent Literature 4 (Japanese Unexamined Patent Application, First Publication No 2011-20192) discloses a solid-type helical edge radius end mill in which a rake angle of a rake face of a bottom edge is set to a negative angle and rake angles of a rake face of a corner R and a rake face of a peripheral cutting edge are also set to negative angles.

CITATION LIST

Patent Literature

[Patent Literature 1]
   Japanese Unexamined Patent Application, First Publication No. Hei 8-281513
[Patent Literature 2]
   Japanese Patent No. 5744235
[Patent Literature 3] Japanese Patent No. 5267556
[Patent Literature 4]
   Japanese Unexamined Patent Application, First Publication No. 2011-20192

SUMMARY OF INVENTION

Technical Problem

In the indexable end mill disclosed in Patent Literature 1, the slit is provided at the front end part of a holder body to extend in the axial direction, the tip having the cutting edge formed at the tip edge to protrude from the slit is sandwiched by the slit, and the cutting edge tip is provided with a set of the peripheral cutting edge which is formed in the axial direction from the apex angle of the cutting edge tip, the bottom edge which is located in a direction substantially perpendicular to the peripheral cutting edge on a diagonal line including an axis center from the apex angle in which the peripheral cutting edge extends, and the cutting edge of the corner R which is formed at the bottom edge corner to contact the peripheral cutting edge and the bottom edge and has a substantially quarter arc shape.

However, in the end mill of Patent Literature 1, there is room for improvement on the biting of the peripheral cutting edge in the finish machining on the side surface of a workpiece or extension of the tool life in the finish machining on the bottom surface.

In Patent Literature 2, the cutting edge shape in which the corner gash is provided in the cutting edge of the corner R is examined and described. In the cutting edge of the corner R in the vicinity of the peripheral cutting edge, a step or a corner at the joint to the peripheral cutting edge is controlled and sharpness is improved so that lateral feeding ability is improved. Further, as disclosed in Patent Literature 2, since the axial rake in the vicinity of the bottom edge decreases, the rake face does not have a step, and the chips can be discharged without any disturbance, the surface roughness of the machining surface can be smooth.

However, in the end mill of Patent Literature 2, there is room for improvement on the biting of the peripheral cutting edge in the finish machining on the side surface of a workpiece and the tool life in the finish machining on the bottom surface.

In Patent Literature 3, the cutting edge shape of the radius end mill capable of securing the chip discharge performance and allowing a more stable cutting performance to be exhibited by preventing a large change in orthogonal rake angle in the cutting edge of the corner R and reducing a change in tilting angle of the cutting edge is examined and described for the cutting edge of the corner R connected from the bottom edge to the peripheral cutting edge.

However, in the end mill of Patent Literature 3, there is room for improvement on the biting of the peripheral cutting edge in the finish machining on the side surface of a workpiece or improvement of the tool life in the finish machining of the bottom surface.

In the solid-type helical edge radius end mill disclosed in Patent Literature 4, since the rake angle of the rake face of the bottom edge is set to a negative angle and the rake angles of the rake face of the corner R and the rake face of the peripheral cutting edge are also set to negative angles, it is possible to improve the durability of the tool and to improve the chip discharge performance while improving the fracture resistance of the bottom edge.

However, in the end mill of Patent Literature 4, there is room for improvement on the biting of the peripheral cutting edge in the finish machining on the side surface of a workpiece and the tool life in the finish machining on the bottom surface.

An object of the present invention is to provide an indexable rotary cutting tool and an insert having excellent dimensional accuracy of finish machining on a side surface perpendicular to a horizontal plane in addition to dimensional accuracy of finishing on a bottom surface of a workpiece by improving cutting performance particularly in machining in which a tool protrusion length is long (for example, L/D is 4 or more) at the time of finish machining a bottom surface corresponding to a machining reference plane or a side surface perpendicular to a horizontal plane in a workpiece such as a mold.

Solution to Problem

In order to achieve the aforementioned objects, an aspect of the present invention provides an indexable rotary cutting tool including: a tool body; and an insert having a cutting edge portion, the insert being separably attached to a mounting seat provided in a front end part of the tool body, wherein the mounting seat includes: a slit-shaped insert fit groove which is formed at the front end part of the tool body to extend in a radial direction orthogonal to a rotation center axis of the tool and including the rotation center axis; and a securing screw configured to fix the insert inserted into the insert fit groove, wherein the cutting edge portion of the insert includes: a peripheral cutting edge which extends along the direction of the rotation center axis; a rake face of the peripheral cutting edge; a bottom cutting edge which extends along the radial direction; a rake face of the bottom cutting edge; a cutting edge of a corner R which connects an outer end of the bottom cutting edge in the radial direction and a front end of the peripheral cutting edge in the direction of the rotation center axis and is formed in an arc shape to protrude toward an outer peripheral side of the front end of the tool body; a rake face of the cutting edge of the corner R; a chamfered surface which includes at least a portion located at an outer side in the radial direction of the rake face of the cutting edge of the corner R or the rake face of the bottom cutting edge; a chip discharge groove which is formed at a base end side of the rake face of the bottom cutting edge in the direction of the rotation center axis; and a chip discharge groove which is formed at an inside of the rake face of the peripheral cutting edge in the radial direction, wherein a twist angle of the peripheral cutting edge has a positive value, wherein an axial rake angle of the cutting edge of the corner R at a boundary point between the cutting edge of the corner R and the peripheral cutting edge has a negative value, wherein an axial rake angle of the cutting edge of the corner R at a boundary point between the cutting edge of the corner R and the bottom cutting edge has a negative value, wherein in a virtual plane, which is perpendicular to a reference plane including the rotation center axis and a predetermined point on the cutting edge of the corner R and includes a virtual straight line passing through the predetermined point and an arc center point of the cutting edge of the corner R, a true rake angle corresponding to an angle in which the rake face of the cutting edge of the corner R is tilted with respect to the reference plane is defined as a radial rake angle, wherein the radial rake angle of the cutting edge of the corner R has a negative value in an entire edge length region of the cutting edge of the corner R, and wherein the radial rake angle has a minimum value at an intermediate portion located between the pair of boundary points in the cutting edge of the corner R (hereinafter, referred to as an "indexable rotary cutting tool of the present invention").

Further, an insert according to another aspect of the present invention is used in the indexable rotary cutting tool (hereinafter, referred to as an "insert of the present invention").

In the indexable rotary cutting tool and the insert of the present invention, the axial rake angle of the cutting edge of the corner R at the boundary point (the outermost peripheral position) between the arc-shaped cutting edge of the corner R and the peripheral cutting edge has a negative value and the axial rake angle of the cutting edge of the corner R at the boundary point (the foremost tip position) between the cutting edge of the corner R and the bottom cutting edge has a negative value. That is, the axial rake angle of the cutting edge of the corner R is set to a negative angle. Further, the twist angle of the peripheral cutting edge has a positive value and is set to a positive angle.

Since the indexable rotary cutting tool and the insert of the present invention have the above-described configuration, the boundary point between the cutting edge of the corner R and the peripheral cutting edge becomes the point (the furthest protruding point) protruding furthest in the tool rotation direction in the circumferential direction around the rotation center axis of the tool. For this reason, in side surface finish machining for machining the wall surface (the vertical surface and the upright wall) perpendicular to the horizontal plane of the workpiece, the cutting edge of the corner R and the peripheral cutting edge start to cut the workpiece by point-contact with the workpiece at the boundary point (the furthest protruding point). Thus, the biting of the cutting edge into the workpiece is improved.

For the cutting started by point-contact from the boundary point, the cutting range of the cutting edge of the corner R and the peripheral cutting edge is widened along with the rotation of the tool. Since the axial rake angle of the cutting edge of the corner R is set to a negative angle, the cutting edge of the corner R has an inverted helical edge shape. Further, the peripheral cutting edge has a regular helical edge shape. For this reason, in the cutting resistance applied from the workpiece to the tool, the cutting resistance (that is, the back component force) applied in the direction of the rotation center axis is applied to the tip side (the edge tip side) in the direction of the rotation center axis in the peripheral cutting edge and is applied to the base end side (the tool shank side) in the direction of the rotation center axis in the cutting edge of the corner R.

Accordingly, it is possible to eliminate the cutting resistance applied to the edge tip side in the peripheral cutting edge. Thus, it is possible to ameliorate a phenomenon in which the tool body is bent due to the cutting resistance applied to the edge tip side in the direction of the rotation center axis (it is possible to reduce bending of the tool due to the cutting resistance).

Further, it is possible to reduce the escape amount of the peripheral cutting edge with respect to the workpiece affecting the dimensional accuracy in the side surface finish machining of the workpiece perpendicular to the horizontal plane and to highly accurately perform finish machining on the machining reference plane corresponding to the perpendicular side surface from the upper portion to the lower portion in the vertical direction.

Further, since the biting of the peripheral cutting edge and the cutting edge of the corner R with respect to the workpiece starts by point-contact, chattering vibration is reduced. Accordingly, it is possible to obtain an effect that the machining is stable.

Further, the radial rake angle has a negative value in the entire edge length region of the cutting edge of the corner R. Further, the radial rake angle becomes a minimum value at the intermediate portion located between the pair of boundary points in the cutting edge of the corner R.

In this way, since both of the radial rake angles of the cutting edges of the corner R of the pair of boundary points have negative values (negative angles), it is possible to sufficiently secure the edge tip strength of the cutting edge of the corner R.

Meanwhile, for example, when either one or both of the radial rake angles of the cutting edges of the corner R of the pair of boundary points are positive values (positive angles) differently from the embodiment, it is disadvantageous in that the strength of the cutting edge of the corner R decreases.

Further, since the radial rake angle becomes a minimum value at the intermediate portion between the pair of boundary points of the cutting edge of the corner R, among the boundary points, the radial rake angle at the boundary point between the cutting edge of the corner R and the bottom cutting edge at these boundary points can approach the positive angle side rather than a minimum value while having a negative value. Accordingly, it is possible to secure the sharpness of the boundary point between the cutting edge of the corner R and the bottom cutting edge in bottom surface finish machining.

Further, the radial rake angle becomes smaller as it goes from the boundary point between the cutting edge of the corner R and the bottom cutting edge in the cutting edge of the corner R toward the boundary point between the cutting edge of the corner R and the peripheral cutting edge (specifically, toward the intermediate portion). That is, the radial rake angle becomes larger to the negative angle side as it goes toward the intermediate portion and becomes a minimum value (that is, the maximum value at the negative angle side) at the intermediate portion. Thus, since the intermediate portion located between the pair of boundary points is provided at the cutting edge boundary portion for cutting a processed hardened layer of a workpiece, the edge tip strength can be significantly improved. For that reason, this is desirable in that the reliability of the cutting edge in bottom surface finish machining on a workpiece which is likely to undergo work hardening or a workpiece surface on which a work-affected layer is formed due to machining with highly efficient conditions can be improved.

According to the above-described embodiments, when the bottom surface corresponding to the machining reference plane or the side surface perpendicular to the horizontal plane is formed on the workpiece such as a mold by finish machining, it is possible to improve the cutting performance particularly in the machining in which the tool protrusion length is long (for example, L/D is 4 or more) and thus to remarkably improve the dimensional accuracy in the finish machining of the side surface perpendicular to the horizontal plane in addition to the dimensional accuracy for finishing the bottom surface of the workpiece.

Further, in the indexable rotary cutting tool, the radial rake angle of the cutting edge of the corner R at the boundary point between the cutting edge of the corner R and the bottom cutting edge is desirably smaller than the radial rake angle of the cutting edge of the corner R at the boundary point between the cutting edge of the corner R and the peripheral cutting edge.

In this case, since the radial rake angle of the cutting edge of the corner R at the boundary point between the cutting edge of the corner R and the bottom cutting edge becomes larger to the negative angle side than the radial rake angle of the cutting edge of the corner R at the boundary point between the cutting edge of the corner R and the peripheral cutting edge, it is possible to improve the fracture resistance of the bottom cutting edge and to improve the chip discharge performance. As a result, it is possible to maintain a high quality in a finished surface.

Further, since the radial rake angle of the cutting edge of the corner R at the boundary point between the cutting edge of the corner R and the peripheral cutting edge can approach the positive angle side while having a negative value, it is possible to reduce the cutting resistance (that is, the feed component force) in the tool radial direction (the horizontal direction) applied from the workpiece to the tool cutting the workpiece in side surface finish machining for machining the wall surface (the upright wall) perpendicular to the workpiece. Accordingly, since a chattering vibration is reduced, the machining accuracy can be improved.

More specifically, for example, when the radial rake angle (the true rake angle) at the boundary point between the cutting edge of the corner R and the bottom cutting edge is indicated by $\alpha$, the radial rake angle (the true rake angle) at the boundary point between the cutting edge of the corner R and the peripheral cutting edge is indicated by $\beta$, and the minimum value of the radial rake angle (the true rake angle) at the intermediate portion is indicated by $\gamma$, the radial rake angle $\alpha$, the radial rake angle $\beta$, and the radial rake angle $\gamma$ all have negative values. Then, when the absolute values of the radial rake angles $\alpha$, $\beta$, and $\gamma$ are respectively indicated by $|\alpha|$, $|\beta|$, and $|\gamma|$, a relationship of $|\gamma|>|\alpha|>|\beta|$ is obtained.

Since the indexable rotary cutting tool has the above-described configuration, in bottom surface finish machining or side surface finish machining (in particular, bottom surface finish machining), the radial rake angle of the cutting edge boundary portion (the intermediate portion located between the pair of boundary points) contacting a processed hardened layer of a workpiece in previous rough machining or intermediate finish machining can be set to the smallest negative value. Accordingly, this is desirable in that there is a significant effect of preventing chipping of the cutting edge boundary portion in rough machining or intermediate finish machining.

Meanwhile, when the above-described relationship of $|\gamma|>|\alpha|>|\beta|$ is not obtained, the cutting edge boundary portion is easily damaged in bottom surface finish machining or side surface finish machining (in particular, bottom surface finish machining) in some cases.

Further, in the indexable rotary cutting tool, an angle in which the virtual straight line projected to the reference plane is tilted with respect to the rotation center axis in the reference plane is defined as the radial angle and the minimum value of the radial rake angle is desirably set in a range in which the radial angle becomes equal to or larger than 5° and equal to or smaller than 50° in the cutting edge of the corner R.

Additionally, the "virtual straight line projected to the reference plane" indicates the projection of the virtual straight line in a direction perpendicular to the reference plane.

Since the indexable rotary cutting tool has the above-described configuration, it is possible to improve the edge tip strength of the cutting edge boundary portion for cutting a processes hardened layer of a workpiece (the intermediate portion located between the pair of boundary points) while securing the sharpness of the boundary point between the cutting edge of the corner R and the bottom cutting edge in bottom surface finish machining. For that reason, this is desirable in that the reliability of the cutting edge in bottom surface finish machining on a workpiece which is likely to undergo work hardening or a workpiece on which a work-affected layer is formed due to machining with highly efficient conditions can be improved.

Specifically, since the point at which the radial rake angle (the true rake angle) of the cutting edge of the corner R becomes a minimum value is located in the region in which the radial angle on the cutting edge of the corner R is 5° or more, it is possible to prevent deterioration in sharpness in bottom surface finish machining. As a result, it is possible to remarkably improve the machining accuracy and to extend the tool life.

Further, since the point in which the radial rake angle (the true rake angle) of the cutting edge of the corner R becomes a minimum value is located in the region in which the radial angle on the cutting edge of the corner R is 50° or less, the cutting edge reinforced portion formed at this minimum value portion tends to fall within the range of a general bottom surface finishing allowance. Therefore, the effect of preventing chipping at the cutting edge boundary portion is remarkably obtained regardless of the bottom surface finishing allowance.

Advantageous Effects of Invention

According to the present invention, it is possible to provide an indexable rotary cutting tool and an insert having excellent dimensional accuracy of finish machining on a side surface perpendicular to a horizontal plane in addition to dimensional accuracy of finishing on a bottom surface of a workpiece by improving cutting performance particularly in machining in which a tool protrusion length is long (for example, L/D is 4 or more) at the time of finish machining a bottom surface corresponding to a machining reference plane or a side surface perpendicular to a horizontal plane in a workpiece such as a mold.

DESCRIPTION OF EMBODIMENTS

Figure 1:
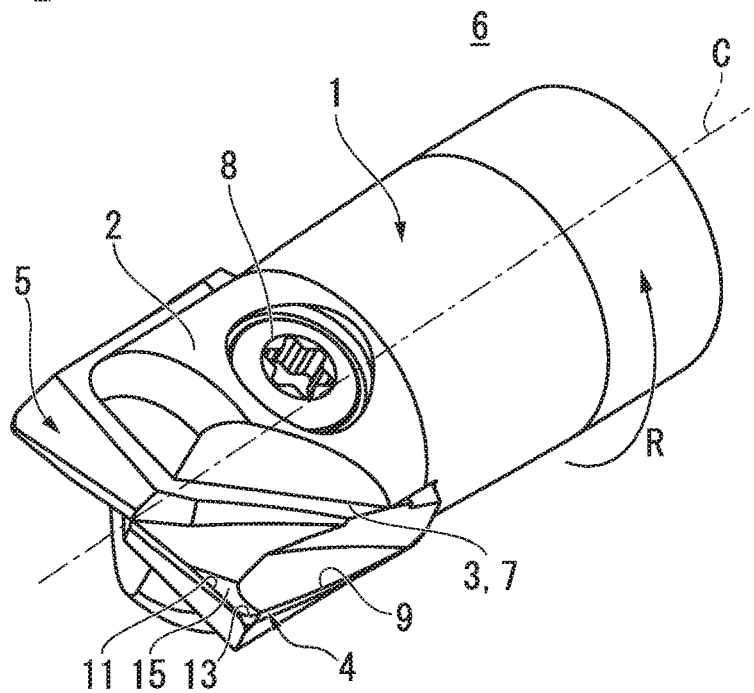
FIG. 1 shows a perspective view of an indexable rotary cutting tool as an example of an embodiment of the present invention.

Hereinafter, embodiments of an indexable radius end mill according to the present invention will be described with reference to the drawings. In the embodiment, an indexable rotary cutting tool of the present invention is applied to a radius end mill of an indexable type (hereinafter, referred to as an "indexable radius end mill"). This indexable rotary cutting tool is particularly suitable for finish machining on a side surface of a workpiece in cutting conditions in which a tool protrusion length is long (L/D is 4 or more). Here, the L value indicates the length of the tool in the direction of the rotation center axis (C) and the D value indicates the diameter of the rotation trajectory of the tool cutting edge.

One of the reasons that the tool is suitable for side surface finish machining in a state in which the tool protrusion length is long is because the biting of a cutting edge (13) of a corner R and a peripheral cutting edge (9) to the workpiece is improved by providing a chamfered surface (15) in which a value of an axial rake angle (Ar1) is negative in the cutting edge (13) of the corner R.

In the embodiment of the present invention to be described below, an indexable radius end mill (6) which is an indexable rotary cutting tool in which an insert (5) having a chamfered surface (15) connecting a rake face (14) of the cutting edge (13) of the corner R, connecting a bottom cutting edge (11) to the peripheral cutting edge (9), to at least a portion located at the outer side in the radial direction in the rake face (12) of the bottom cutting edge is separably attached to the tool body (1) will be described.

FIG. 1 is a perspective view showing a configuration example of the indexable radius end mill (6) as an example of the embodiment of the present invention.

Figure 2:
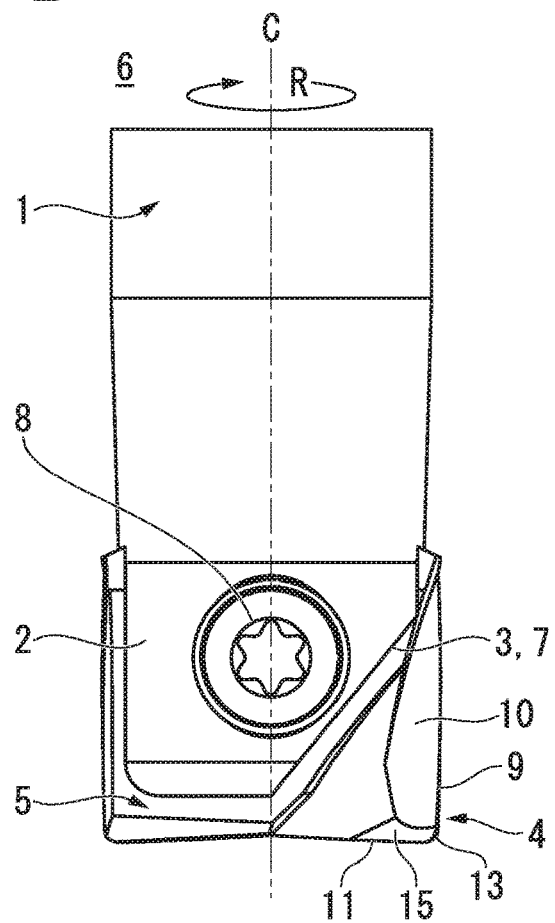
FIG. 2 shows a plan view of the indexable rotary cutting tool shown in FIG. 1.

FIG. 2 is a plan view of the indexable radius end mill (6) shown in FIG. 1.

Figure 3:
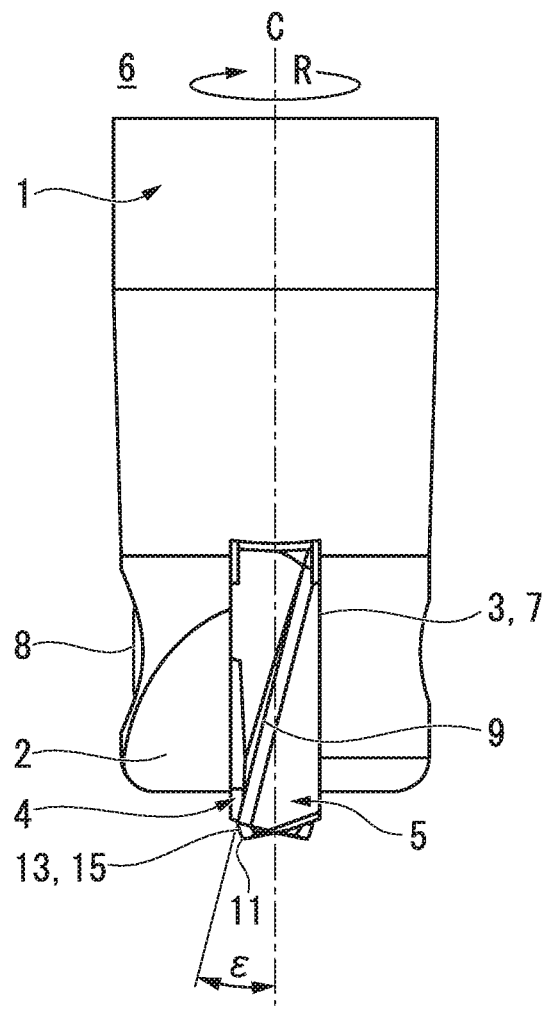
FIG. 3 shows a side view of the indexable rotary cutting tool shown in FIG. 1.

FIG. 3 is a side view of the indexable radius end mill (6) shown in FIG. 1.

Figure 4:
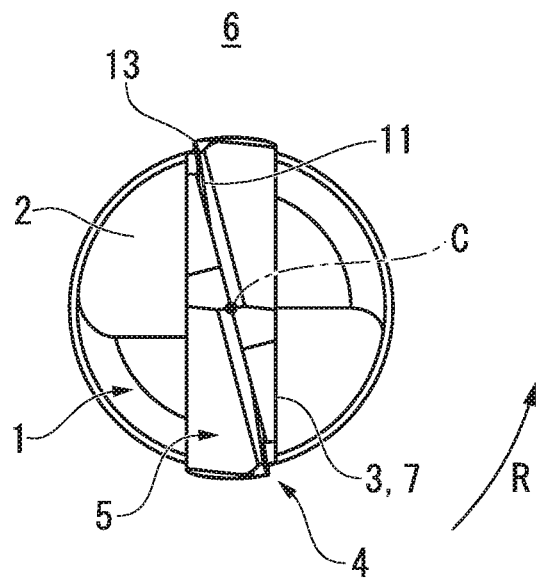
FIG. 4 shows a front view of the indexable rotary cutting tool shown in FIG. 1.

FIG. 4 is a front view of the indexable radius end mill (6) shown in FIG. 1.

Figure 5:
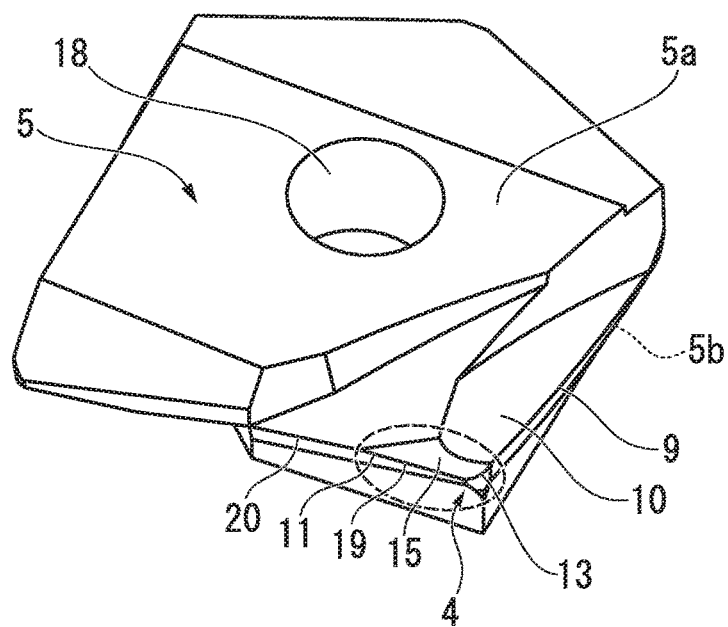
FIG. 5 shows a perspective view of an insert attached to the indexable rotary cutting tool shown in FIG. 1.

FIG. 5 is a perspective view showing the insert (5) of the indexable radius end mill (6) shown in FIG. 1.

[Schematic Configuration of Indexable Radius End Mill]

As shown in FIGS. 1 to 4, the indexable radius end mill (6) includes the tool body (1) which has a substantially columnar shape and the insert (5) which is separately attached to a mounting seat (3) formed at a front end part (2) in the direction of the rotation center axis (C) of the tool body (1) and has a cutting edge portion (4).

At the base end portion in the direction of the rotation center axis (C) of the tool body (1), a shank portion (not shown) is integrally formed with the tool body (1).

The indexable radius end mill (6) of the embodiment includes the tool body (1) which is made of steel or cemented carbide and the insert (5) which is made of cemented carbide and the insert (5) having a plate shape is separably attached to the mounting seat (the insert mounting seat) (3) formed at the front end part (2) of the tool body (1) rotated around the rotation center axis (C) so that the insert center axis (the symmetry axis of the cutting edge portion (4) formed at the insert (5)) is aligned with the rotation center axis (C) of the tool.

The insert (5) which is attached to the mounting seat (3) is disposed so that the cutting edge portion (4) protrudes toward the tip side of the tool body (1) and the outer side in the radial direction.

In the indexable radius end mill (6), the base end portion (the shank portion) of the tool body (1) is indirectly or directly attached to a spindle (not shown) of a machining tool through a chuck and the indexable radius end mill is rotated in the tool rotation direction (R) around the rotation center axis (C) with the rotational driving of the spindle so that milling is performed on a workpiece made of a metal material or the like.

[Definition of Directions Used in Embodiment]

In the embodiment, the extension direction of the rotation center axis (C) of the tool body (1), that is, the direction parallel to the rotation center axis (C) will be referred to as the direction of the rotation center axis (C). Further, regarding the direction of the rotation center axis (C), a direction from the shank portion of the tool body (1) toward the mounting seat (3) will be referred to as toward the tip side (the lower side in FIGS. 2 and 3) and a direction from the mounting seat (3) toward the shank portion will be referred to as toward the base end side (the upper side in FIGS. 2 and 3).

Further, the direction orthogonal to the rotation center axis (C) will be referred to as the radial direction. Regarding the radial direction, the direction of moving toward the rotation center axis (C) will be referred to as inwards in the radial direction and the direction of moving away from the rotation center axis (C) will be referred to as outwards in the radial direction.

Further, the direction around the rotation center axis (C) will be referred to as the circumferential direction. Regarding the circumferential direction, a direction in which the tool body (1) is rotated with the rotational driving of the spindle during cutting will be referred to as the tool rotation direction (R) and the opposite rotation direction will be referred to as the opposite (that is, the counter tool rotation direction) to the tool rotation direction (R).

Additionally, the definition of the above-described orientations (directions) is applied to the entire indexable radius end mill (6) and is also applied to the insert (5) of which the insert center axis is aligned with (is disposed to be coaxial to) the rotation center axis (C) of the indexable radius end mill (6) in the same way.

[Mounting Seat]

In the mounting seat (3), the front end part (2) of the tool body (1) is provided with a slit-shaped insert fit groove (7) which extends in the radial direction and including the rotation center axis (C) of the tool and a securing screw (8) which fixes the insert (5) inserted into the insert fit groove (7).

As shown in FIGS. 3 and 4, the insert mounting seat (3) includes the slit-shaped insert fit groove (7) which is open to the front end part (2) of the tool body (1), extends in the radial direction of the tool body (1) and opens to the outer peripheral surface of the tool body (1), and is formed to have a predetermined length (depth) toward the base end side of the tool body (1).

Since the front end part (2) of the tool body (1) is provided with the slit-shaped insert fit groove (7), the front end part (2) of the tool body (1) is divided into two parts so that a pair of tip halves are formed. Then, an insert securing screw hole is formed from one surface portion of the tip half to the other tip half to intersect the insert fit groove (7). The direction of the insert securing screw hole is formed in the direction orthogonal to the direction in which the insert fit groove (7) of the tool body (1) extends in the radial direction of the tool body (1).

Further, a female screw portion to be fitted to a male screw portion of the securing screw (8) is engraved in the inner peripheral surface of the insert securing screw hole formed from one tip half to the other tip half.

[Insert]

A configuration example of the insert (5) having the cutting edge will be described with reference to FIGS. 5 to 11.

FIG. 5 is a perspective view of the insert (5) of the inventive example.

Figure 6:
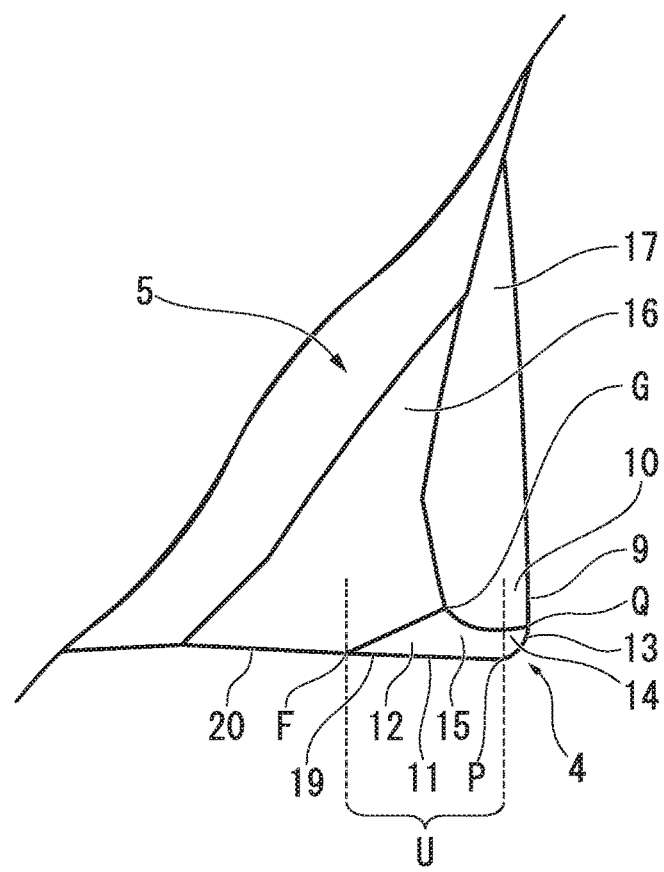
FIG. 6 shows an enlarged plan view of the vicinity of a cutting edge portion of a corner R of the insert shown in FIG. 5.

FIG. 6 is an enlarged plan view in the vicinity of the cutting edge (13) of the corner R of the insert (5) shown in FIG. 5.

Figure 7:
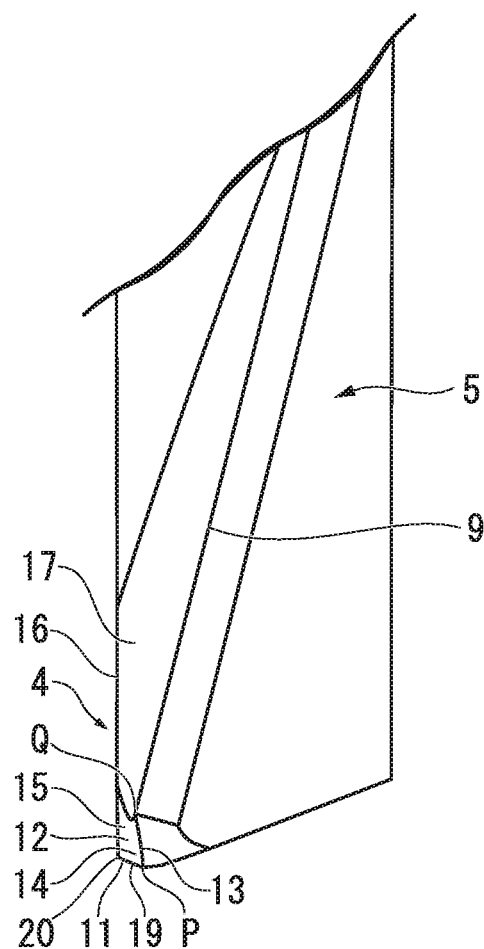
FIG. 7 shows an enlarged side view of the vicinity of the cutting edge portion of the corner R of the insert shown in FIG. 5.

FIG. 7 is an enlarged side view in the vicinity of the cutting edge (13) of the corner R of the insert (5) shown in FIG. 5.

Figure 8:
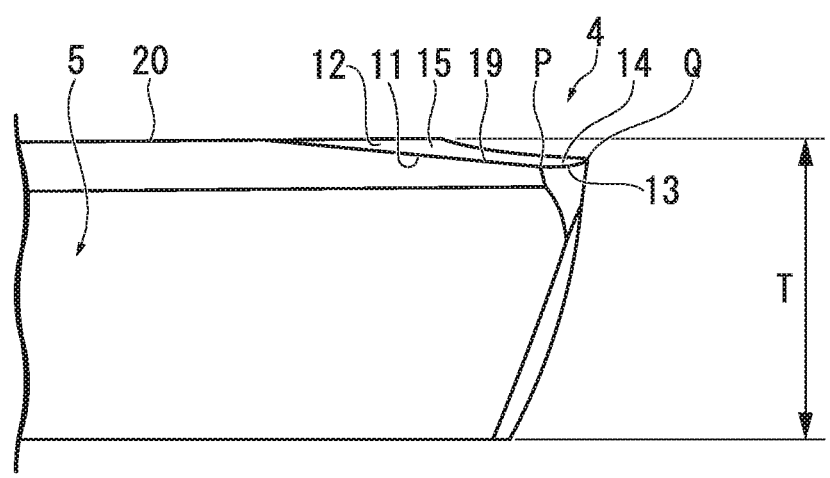
FIG. 8 shows an enlarged front view of the vicinity of the cutting edge portion of the corner R of the insert shown in FIG. 5.

FIG. 8 is an enlarged front view in the vicinity of the cutting edge (13) of the corner R of the insert (5) shown in FIG. 5.

Figure 9:
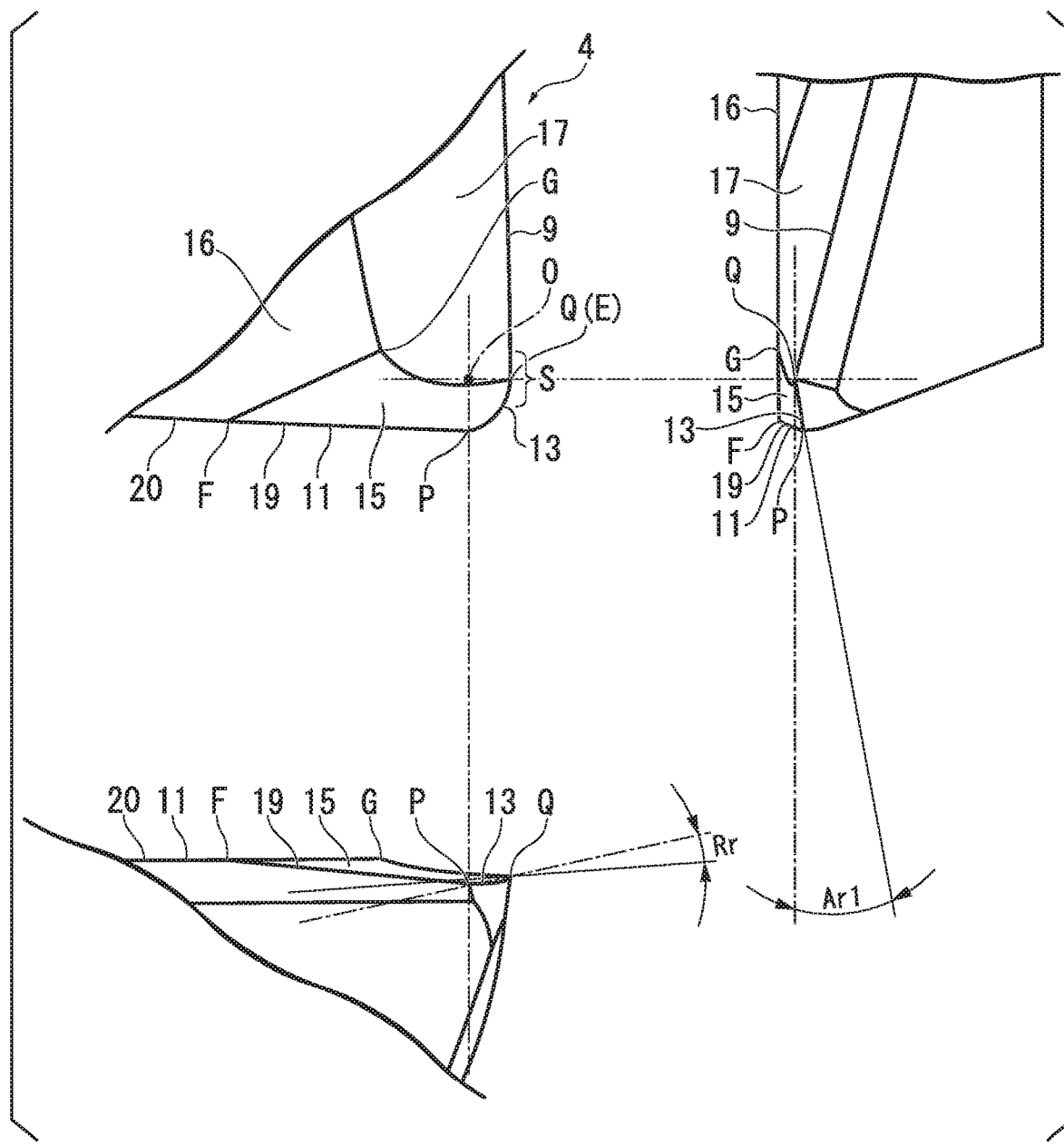
FIG. 9 shows an enlarged view of the vicinity of the cutting edge portion of the corner R shown in FIG. 5.

FIG. 9 is an enlarged view in the vicinity of the cutting edge (13) of the corner R shown in FIG. 5.

Figure 10:
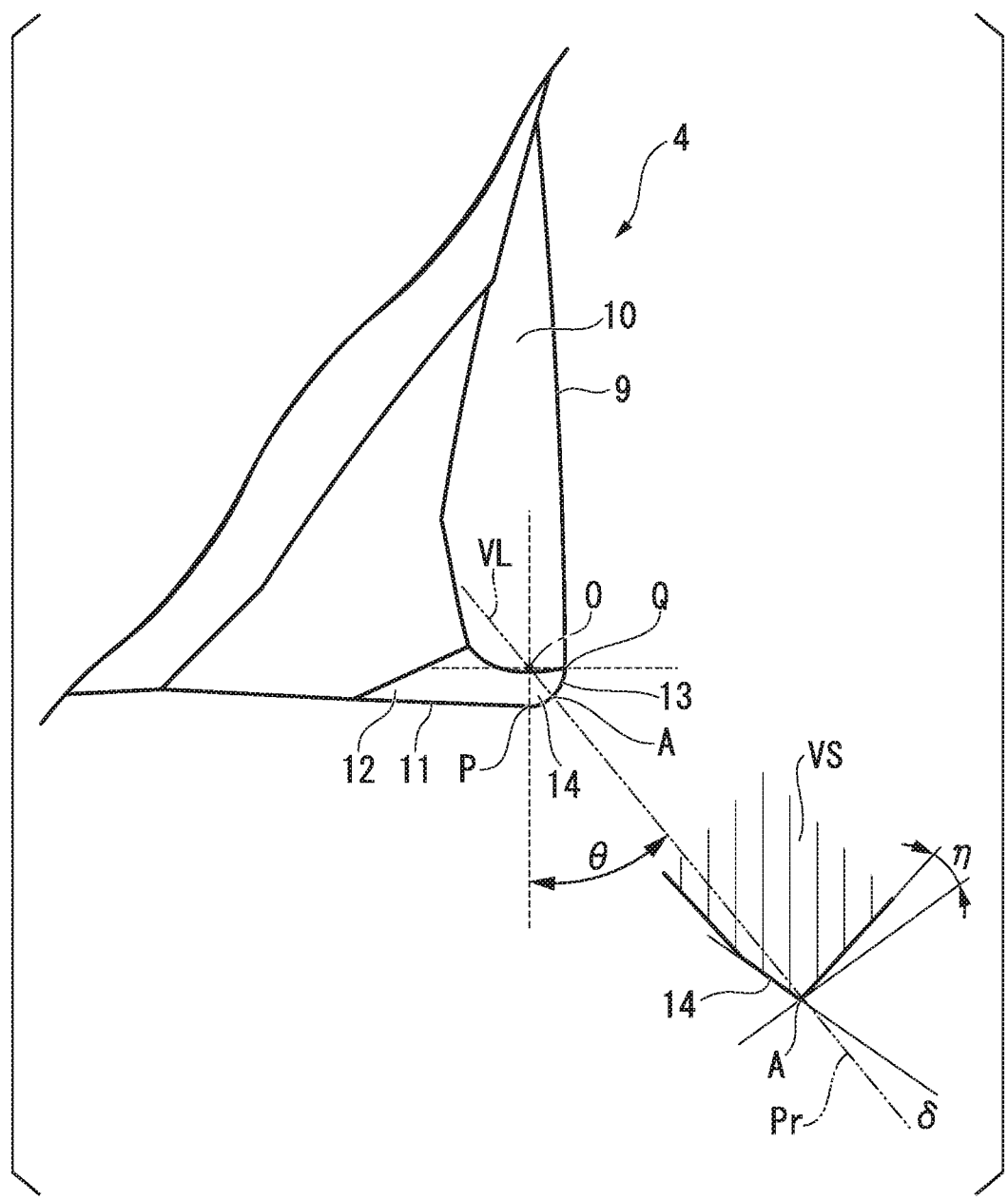
FIG. 10 shows a diagram illustrating a radial rake angle and a radial angle of the cutting edge of the corner R of the indexable rotary cutting tool of the embodiment.

FIG. 10 is a diagram illustrating the radial rake angle (δ) and the radial angle (θ) of the cutting edge (13) of the corner R of the indexable radius end mill (6) of the embodiment.

Figure 11:
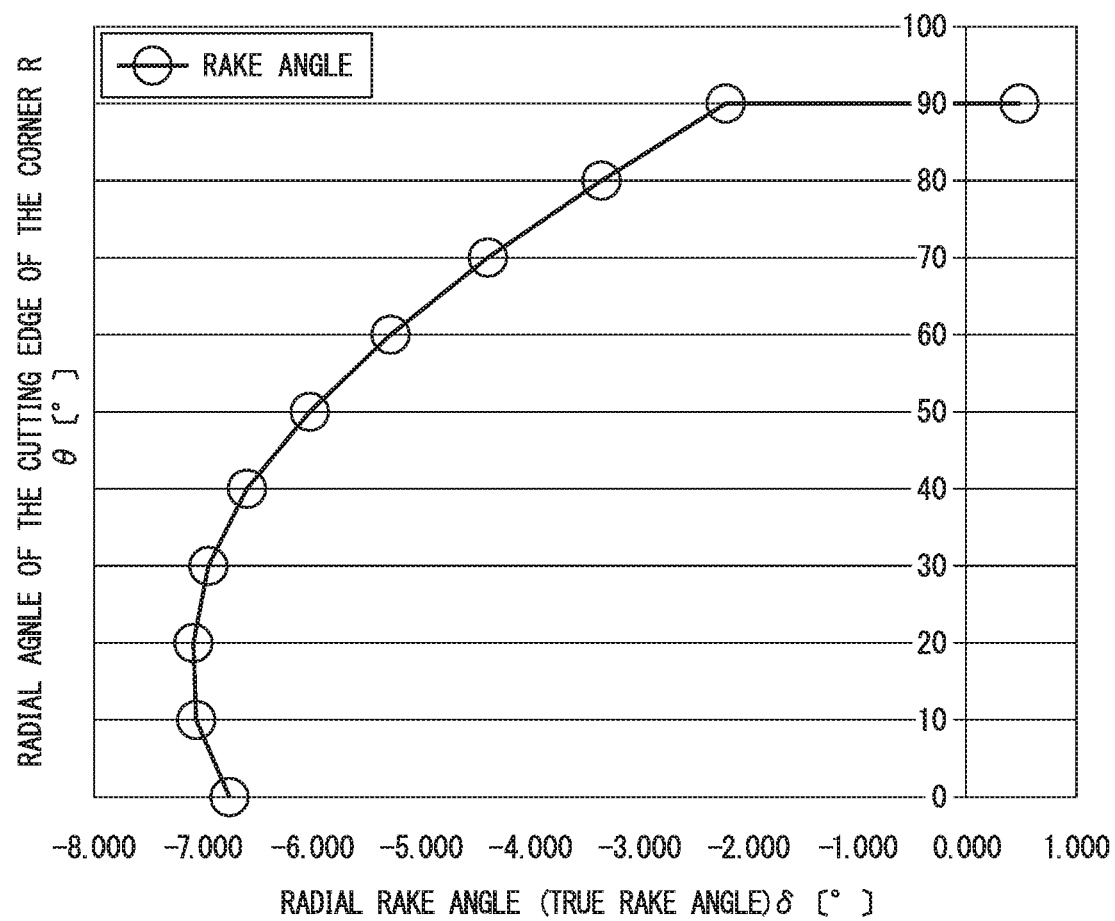
FIG. 11 shows a profile of the radial rake angle of the cutting edge of the corner R of the indexable rotary cutting tool of the embodiment.

FIG. 11 shows a profile of the radial rake angle of the cutting edge (13) of the corner R of the indexable radius end mill (6) of the embodiment.

The insert (5) has a substantially plane shape as shown in FIG. 5 and has a thickness T as shown in FIG. 8. The insert (5) includes a screw insertion hole (18) into which the securing screw (8) for fixing the insert (5) to the mounting seat (3) is inserted and the cutting edge portion (4) which enters the workpiece to perform cutting thereon.

As shown in FIG. 5, the insert (5) includes the screw insertion hole (18) which penetrates the insert from one outer surface portion (5a) toward the other outer surface portion (5b). The screw insertion hole (18) is a through-hole through which the securing screw (8) is inserted when attaching and fixing the insert (5) to the mounting seat (3).

The cutting edge portion (4) includes a rake face which faces in the tool rotation direction (R), a flank face which faces the outer side in the radial direction and the tip side to intersect the rake face, and a cutting edge which is formed at an intersection ridgeline between the rake face and the flank face. The cutting edge includes the peripheral cutting edge (9), the bottom cutting edge (11), and the cutting edge (13) of the corner R. Since the cutting edge includes the peripheral cutting edge (9), the bottom cutting edge (11) and the cutting edge (13) of the corner R, the cutting edge is formed in a substantially L-shape on the whole. Further, in each of the cutting edges (9, 11, 13), the rake face and the flank face are disposed adjacently.

The insert (5) of the embodiment is a two-edge cutting insert and includes two sets of cutting edges including the peripheral cutting edge (9), the bottom cutting edge (11), and the cutting edge (13) of the corner R. The two sets of cutting edges are disposed at the rotational symmetry positions of 180° around the rotation center axis (C).

The reference sign "9" shown in FIGS. 5 and 6 indicates the peripheral cutting edge (9) of the insert (5). The peripheral cutting edge (9) extends along the direction of the rotation center axis (C). Specifically, the peripheral cutting edge (9) extends to be helically twisted in a direction opposite to the tool rotating direction (R) as it goes from its tip connected to the cutting edge (13) of the corner R toward the base end side. That is, as shown in FIG. 3, the twist angle (ε) of the peripheral cutting edge (9) is set to a positive value (a positive angle). The size of the twist angle (ε) of the peripheral cutting edge (9) is not particularly limited, but is desirably in the range of 2° to 20°. Accordingly, it is possible to obtain an effect of reducing cutting resistance and an effect of improving chip discharge performance in a well-balanced manner. Further, the range of the size of the twist angle (δ) of the peripheral cutting edge (9) is more desirably 2° to 15° and is particularly desirable 3° to 8°.

When the insert (5) is attached to the mounting seat (3) and the indexable radius end mill (6) is rotated around the rotation center axis (C), the rotation trajectories of the pair of peripheral cutting edges (9) are formed in a cylindrical shape.

When the insert (5) is attached to the mounting seat (3) (the insert fit groove (7) of the tool body (1), as shown in FIGS. 6 and 9, a boundary point (Q) between the peripheral cutting edge (9) and the cutting edge (13) of the corner R becomes the outermost peripheral point in the perpendicular line direction (that is, the radial direction) with respect to the rotation center axis (C). At the boundary point (Q), the front end of the peripheral cutting edge (9) is connected to the base end of the cutting edge (13) of the corner R. That is, the cutting edge directed from the boundary point (Q) to the base end side is the peripheral cutting edge (9) and the cutting edge directed from the boundary point (Q) to the tip side is the cutting edge (13) of the corner R.

A rake face (10) of the peripheral cutting edge (9) facing in the tool rotation direction (R) is disposed adjacent to the inner side in the radial direction of the peripheral cutting edge (9). A chip discharge groove (17) is formed on the inner side in the radial direction of the rake face (10) of the peripheral cutting edge (9). The chip discharge groove (17) extends along the direction of the rotation center axis (C).

The flank face of the peripheral cutting edge (9) is disposed adjacent to the opposite side (R) of the peripheral cutting edge (9) in the tool rotation direction. The flank face is formed outward in the radial direction and is tilted to face inward in the radial direction as it goes from the peripheral cutting edge (9) in the direction opposite to the tool rotation direction (R) such that a flank angle is provided.

The reference sign "11" shown in FIGS. 5 and 6 indicates the bottom cutting edge (11) of the insert (5). The bottom cutting edge (11) extends along the radial direction. Specifically, the bottom cutting edge (11) extends toward the base end side as it goes from the outer end adjacent to (connected to) the cutting edge (13) of the corner R in the radial direction toward the inner side in the radial direction and is slightly tilted with respect to a plane (a horizontal plane) perpendicular to the rotation center axis (C).

When the insert (5) is attached to the mounting seat (3) and the indexable radius end mill (6) is rotated around the rotation center axis (C), the rotation trajectories of the pair of bottom cutting edges (11) are formed in a substantially conical shape.

When the insert (5) is attached to the mounting seat (3) (the insert fit groove (7) of the tool body (1), the boundary point (P) between the cutting edge (13) of the corner R and the bottom cutting edge (11) is located at the foremost front end part of the tool in the direction of the rotation center axis (C), that is, the lowermost point as shown in FIGS. 6 and 9. At the boundary point (P), the outer end of the bottom cutting edge (11) in the radial direction is connected to the inner end of the cutting edge (13) of the corner R in the radial direction. That is, the cutting edge directed from the boundary point (P) toward the inner side in the radial direction is the bottom cutting edge (11) and the cutting edge directed from the boundary point (P) toward the outer side in the radial direction is the cutting edge (13) of the corner R. Additionally, the reference sign "U" of FIG. 6 indicates a bottom cutting edge region which is a cutting edge ridgeline region facing the side of the bottom cutting edge (11) (the inner side in the radial direction) in relation to the position of the boundary point (P).

The rake face (12) of the bottom cutting edge (11) facing the tool rotation direction (R) is adjacently disposed at the base end side of the bottom cutting edge (11). A chip discharge groove (16) is formed at the base end side of the rake face (12) of the bottom cutting edge (11). The chip discharge groove (16) extends along the direction of the rotation center axis (C). The chip discharge groove (16) of the bottom cutting edge (11) is adjacently disposed at the inside of the chip discharge groove (17) of the peripheral cutting edge (9) in the radial direction. These chip discharge grooves (16, 17) are formed by different surfaces.

The flank face of the bottom cutting edge (11) is adjacently disposed at the opposite side to the tool rotation direction (R) of the bottom cutting edge (11). The flank face is formed toward the tip side and is tilted toward the base end side as it goes from the bottom cutting edge (11) toward the opposite side to the tool rotation direction (R) so that a flank angle is given.

Additionally, in the example shown in the embodiment, the bottom cutting edge (11) includes an outer bottom cutting edge (19) which is located at the outer side in the radial direction in the edge length region (the entire length) of the bottom cutting edge (11) to be connected to the cutting edge (13) of the corner R and to extend from the cutting edge (13) of the corner R toward the inner side in the radial direction and an inner bottom cutting edge (20) which is disposed at the inner side in the radial direction in relation to the outer bottom cutting edge (19) in the edge length region and extends from the outer bottom cutting edge (19) toward the inner side in the radial direction. Then, a portion corresponding to the outer bottom cutting edge (19) in the bottom cutting edge (11) is disposed in the bottom cutting edge region (U).

In a plan view in which the insert (5) shown in FIG. 6 is viewed from the upper side, that is, the rake face (12) of the bottom cutting edge (11) is viewed from the front side, the outer bottom cutting edge (19) and the inner bottom cutting edge (20) of the bottom cutting edge (11) extend in a straight line so as to form one straight line having no bending point at the connecting portion thereof.

Here, the displacement amount in the circumferential direction per unit length in the direction of the rotation center axis (C) of the rake face (12) of the bottom cutting edge (11), that is, the inclination of the rake face (12) with respect to the direction of the rotation center axis (C) becomes larger at the outer bottom cutting edge (19) in relation to the inner bottom cutting edge (20).

Specifically, the axial rake angle (the axial rake) of the bottom cutting edge (11) becomes larger to the negative angle side at the outer bottom cutting edge (19) in relation to the inner bottom cutting edge (20). That is, the absolute value of the axial rake angle of the outer bottom cutting edge (19) becomes larger than that of the inner bottom cutting edge (20).

This is because a portion corresponding to the outer bottom cutting edge (19) in the rake face (12) of the bottom cutting edge (11) is disposed at the chamfered surface (15). The chamfered surface (15) will be separately described later. Additionally, in the example of the embodiment, the axial rake angle of the inner bottom cutting edge (20) is set to 0° and the axial rake angle of the outer bottom cutting edge (19) is set to a negative value.

In a front view in which the insert (5) shown in FIG. 8 is viewed from the front side, that is, the insert (5) is viewed from the tip of the rotation center axis (C) toward the base end side, the displacement amount in the circumferential direction per unit length in the radial direction of the bottom cutting edge (11), that is, the inclination of the bottom cutting edge (11) with respect to the radial direction is larger at the outer bottom cutting edge (19) in relation to the inner bottom cutting edge (20). Specifically, the rake angle (the radial rake and the radial rake angle) in the center direction of the bottom cutting edge (11) becomes larger to a negative angle side at the outer bottom cutting edge (19) in relation to the inner bottom cutting edge (20). That is, the absolute value of the rake angle in the center direction of the outer bottom cutting edge (19) is larger than that of the inner bottom cutting edge (20). Additionally, in the example of the embodiment, the rake angle in the center direction of the inner bottom cutting edge (20) and the rake angle in the center direction of the outer bottom cutting edge (19) are both set to a negative value.

The reference sign "13" shown in FIG. 5 indicates the cutting edge (13) of the corner R which connects the bottom cutting edge (11) of the insert (5) to the peripheral cutting edge (9). The cutting edge (13) of the corner R connects the outer end of the bottom cutting edge (11) in the radial direction to the front end of the peripheral cutting edge (9) and is formed in an arc shape protruding toward the outer peripheral side of the tip of the tool body (1).

When the insert (5) is attached to the mounting seat (3) and the indexable radius end mill (6) is rotated around the rotation center axis (C), the rotation trajectories of the pair of cutting edges (13) of the corner R (the shape of the cross-section including the rotation center axis (C) of the rotation trajectory and parallel to the direction of the rotation center axis (C)) are formed in a substantially quarter arc shape.

When the insert (5) is attached to the mounting seat (3) (the insert fit groove 7) of the tool body (1), as shown in FIGS. 6 and 9, the cutting edge (13) of the corner R becomes an arc edge connected from the lowermost point (the boundary point P) located at the outer end of the bottom cutting edge (11) in the radial direction to the outermost peripheral point (the boundary point Q) of the tool located at the front end of the peripheral cutting edge (9).

The rake face (14) of the cutting edge (13) of the corner R facing the tool rotation direction (R) is adjacently disposed at the inner side in the radial direction of the cutting edge (13) of the corner R and the base end side. The rake face (14) of the cutting edge (13) of the corner R is gradually tilted in the tool rotation direction (R) as it goes toward the base end side in the direction of the rotation center axis (C). That is, the axial rake angle (Ar) of the cutting edge (13) of the corner R is set to a negative angle in the entire region of the cutting edge (13) of the corner R. For this reason, as shown in FIG. 9, the axial rake angle (Ar1) of the cutting edge (13) of the corner R at the boundary point (Q) between the cutting edge (13) of the corner R and the peripheral cutting edge (9) has a negative value and the axial rake angle (Ar2) of the cutting edge (13) of the corner R at the boundary point (P) between the cutting edge (13) of the corner R and the bottom cutting edge (11) also has a negative value.

Additionally, the reference sign "Rr" shown in FIG. 9 indicates the radial rake angle of the cutting edge (13) of the corner R and the radial rake angle of the cutting edge (13) of the corner R at the boundary point (Q) is shown in FIG. 9. In the cutting edge (13) of the corner R, the radial rake angle (Rr) is desirably set to a negative angle from the boundary point (Q) toward the boundary point (P) along the edge length region.

The flank face of the cutting edge (13) of the corner R is adjacently disposed at the opposite side to the tool rotation direction (R) of the cutting edge (13) of the corner R. The flank face is formed in a curved surface shape protruding toward the outer peripheral side of the tip of the tool body (1) and is formed toward the outer side in the radial direction and the tip side. The flank face is tilted toward the inner side in the radial direction and the base end side as it goes from the cutting edge (13) of the corner R to the opposite side to the tool rotation direction (R) so that a flank angle is given.

The reference sign "15" shown in FIG. 6 indicates the chamfered surface (15) which connects the rake face (14) of the cutting edge (13) of the corner R to the rake face (12) of the bottom cutting edge (11). The chamfered surface (15) includes the rake face (14) of the cutting edge (13) of the corner R and at least a portion located at the outer side in the radial direction of the rake face (12) of the bottom cutting edge (11) (in the example of the embodiment, a portion corresponding to the outer bottom cutting edge (19)). In other words, the chamfered surface (15) of the embodiment serves as the rake face (14) of the entire cutting edge (13) of the corner R and the rake face of the outer bottom cutting edge (19) in the bottom cutting edge (11).

As shown in FIGS. 6 and 9, the chamfered surface (15) is formed in a region surrounded by the outer bottom cutting edge (19) of the bottom cutting edge (11), the cutting edge (13) of the corner R, the curved ridgeline connecting the point G of the rake face and the boundary point (Q) existing within the region (S), and the straight ridgeline connecting the point F on the bottom cutting edge (11) and the point G Additionally, the above-described region (S) is a region extending from the front end part of the region where peripheral cutting edge (9) is to be formed to the base end portion of the region where the cutting edge (13) of the corner R is to be formed. A relationship between the region (S) and the boundary point (Q) will be separately described in the embodiments to be described later. Further, the above-described point G indicates an intersection point in which three surfaces of the pair of chip discharge grooves (16, 17) and the chamfered surface (15) meet and the ridgelines (the ridgelines as the boundaries of the chip discharge grooves (16, 17) and the chamfered surface (15)) extend radially in three directions from this point G Further, the point F indicates a connection point between the outer bottom cutting edge (19) and the inner bottom cutting edge (20) of the bottom cutting edge (11).

In the example of the embodiment, the chamfered surface (15) is a plane region surrounded by the cutting edge and the ridgeline.

[Radial Rake Angle and Radial Angle of Cutting Edge of Corner R]

Thus, the indexable radius end mill (6) has the following particular technical features in the vicinity of the cutting edge (13) of the corner R of the cutting edge portion (4).

The reference sign "Pr" shown in FIG. 10 indicates a reference plane perpendicular to a main movement direction (the tool rotation direction R) of the tool of the indexable radius end mill (6). The reference plane (Pr) indicates a virtual plane including the rotation center axis (C) and in the embodiment, as shown in FIG. 10, the predetermined point (A) on the cutting edge (13) of the corner R is included in the plane. Further, the left upper diagram of FIG. 10 is an enlarged view in the vicinity of the cutting edge portion of the corner R of the insert when viewed from a direction perpendicular to the reference plane (Pr).

The reference sign "O" indicates the arc center point of the cutting edge (13) of the corner R.

The reference sign "VL" indicates a virtual straight line passing through the arc center point (O) of the cutting edge (13) of the corner R and a predetermined point (A) of the cutting edge (13) of the corner R.

The cross-section (the hatched surface) of the insert (5) indicated by the reference sign "VS" in the right lower diagram of FIG. 10 indicates a virtual plane which is perpendicular to the reference plane (Pr) and includes the virtual straight line (VL).

The reference sign "δ" indicates a radial rake angle which is an angle (an angle formed between the virtual straight line (VL) and the rake face (14)) in which the rake face (14) of the cutting edge (13) of the corner R is tilted with respect to the reference plane (Pr) in the virtual plane (VS). The radial rake angle (δ) indicates a true rake angle. In the embodiment, the predetermined point (A) on the cutting edge (13) of the corner R moves on the cutting edge (13) of the corner R so that the radial rake angle (δ) changes. In other words, the radial rake angle (δ) becomes different depending on the position on the cutting edge (13) of the corner R of the point (A).

The reference sign "η" indicates a flank angle at the predetermined point (A) of the cutting edge (13) of the corner R, in other words, an angle formed between the flank face of the cutting edge (13) of the corner R and the straight line orthogonal to the virtual straight line (VL) in the virtual plane (VS).

The reference sign "θ" indicates a radial angle which is an angle in which the virtual straight line (VL) is tilted with respect to the rotation center axis (C). Specifically, the radial angle (θ) indicates an angle in which the virtual straight line (VL) projected to the reference plane (Pr) (that is, the virtual straight line (VL) of FIG. 10) is tilted with respect to the rotation center axis (C) in the reference plane (Pr). Additionally, the "virtual straight line (VL) projected to the reference plane (Pr)" indicates the projection of the virtual straight line (VL) in a direction perpendicular to the reference plane (Pr).

Then, as shown in FIG. 11 showing a relationship between the radial rake angle (δ) and the radial angle (θ) of the cutting edge (13) of the corner R, the radial rake angle (δ) of the cutting edge (13) of the corner R has a negative value in the entire edge length region of the cutting edge (13) of the corner R and continuously changes.

Further, the radial rake angle (δ) of the cutting edge (13) of the corner R at the boundary point (P) (that is, θ=0°) between the cutting edge (13) of the corner R and the bottom cutting edge (11) is smaller than the radial rake angle (δ) of the cutting edge (13) of the corner R at the boundary point (Q) (that is, θ=90°) between the cutting edge (13) of the corner R and the peripheral cutting edge (9).

Additionally, in FIG. 11, the right end data at θ=90° is the true rake angle of the peripheral cutting edge (9) at the boundary point (Q) between the cutting edge (13) of the corner R and the peripheral cutting edge (9) and has a positive value.

In the embodiment, the value of the radial rake angle (δ) of the cutting edge (13) of the corner R at the boundary point (P) (the radial angle θ=0°) becomes twice or more to the negative angle side the value of the radial rake angle (δ) of the cutting edge (13) of the corner R at the boundary point (Q) (the radial angle θ=90°) and becomes three times or more in the example shown in FIG. 11.

Further, as shown in FIG. 11, the radial rake angle (δ) becomes a minimum value at the intermediate portion between the pair of boundary points (P, Q) in the cutting edge (13) of the corner R. In other words, the radial rake angle (δ) becomes largest to the negative angle side at the intermediate portion between the pair of boundary points (P, Q). Additionally, the intermediate portion located between the pair of boundary points (P, Q) is a region (0°<θ<90°) except for the boundary point (P, Q) in the cutting edge (13) of the corner R.

Specifically, the minimum value of the radial rake angle (δ) is set to be in a range of equal to or larger than 5° and equal to or smaller than 50° of the radial angle (θ) in the cutting edge (13) of the corner R. In other words, a point in which the radial rake angle (δ) becomes a minimum value is located in a region in which the radial angle (θ) is equal to or larger than 5° and equal to or smaller than 50° in the cutting edge (13) of the corner R. In the example shown in FIG. 11, the radial rake angle (δ) becomes the minimum value in the range equal to or larger than 10° and equal to or smaller than 30° of the radial angle (θ) (in particular, around 20°).

[Operational Effects of Embodiment]

In the indexable radius end mill (6) and the insert (5) of the above-described embodiment, the axial rake angle (Ar1) of the cutting edge (13) of the corner R at the boundary point (Q) (the outermost peripheral position) between the arc-shaped cutting edge (13) of the corner R and the peripheral cutting edge (9) has a negative value and the axial rake angle (Ar2) of the cutting edge (13) of the corner R at the boundary point (P) (the foremost tip position) between the cutting edge (13) of the corner R and the bottom cutting edge (11) has a negative value. That is, the axial rake angle (Ar) of the cutting edge (13) of the corner R is set to a negative angle. Further, the twist angle (ε) of the peripheral cutting edge (9) has a positive value and is set to a positive angle.

Since the indexable radius end mill (6) and the insert (5) of the embodiment have the above-described configuration, the boundary point (Q) between the cutting edge (13) of the corner R and the peripheral cutting edge (9) becomes the point (the furthest protruding point) protruding furthest in the tool rotation direction (R) in the circumferential direction around the rotation center axis (C) of the tool. For this reason, as for the side surface finish machining of machining the wall surface (the vertical surface and the upright wall) of the workpiece perpendicular to the horizontal plane, the cutting edge (13) of the corner R and the peripheral cutting edge (9) starts to cut the workpiece by point-contact with the workpiece at the boundary point (Q) (the furthest protruding point). Thus, the biting of the cutting edge to the workpiece is improved.

For the cutting started by the point-contact from the boundary point (Q), the cutting range of the cutting edge (13) of the corner R and the peripheral cutting edge (9) is widened along with the rotation of the tool. Since the axial rake angle (Ar1) of the cutting edge (13) of the corner R is set to a negative angle, the cutting edge (13) of the corner R has an inverted helical edge shape. Further, the peripheral cutting edge (9) has a regular helical edge shape. For this reason, in the cutting resistance applied from the workpiece to the tool, the cutting resistance (that is, the back component force) applied in the direction of the rotation center axis (C) is applied to the tip side (the edge tip side) in the direction of the rotation center axis (C) in the peripheral cutting edge (9) and is applied to the base end side (the tool shank side) in the direction of the rotation center axis (C) in the cutting edge (13) of the corner R.

Accordingly, it is possible to eliminate the cutting resistance applied to the edge tip side in the peripheral cutting edge (9). Thus, it is possible to improve a phenomenon in which the tool body (1) is bent by the cutting resistance applied to the edge tip side in the direction of the rotation center axis (C).

Further, it is possible to reduce the escape amount of the peripheral cutting edge (9) with respect to the workpiece affecting the dimensional accuracy in the side surface finish machining of the workpiece perpendicular to the horizontal plane and to highly accurately perform finish machining on the machining reference plane corresponding to the perpendicular side surface from the upper portion to the lower portion in the vertical direction.

Further, since the biting of the peripheral cutting edge (9) and the cutting edge (13) of the corner R with respect to the workpiece starts by the point-contact, chattering vibration is reduced. Accordingly, it is possible to obtain an effect that the machining is stable.

Further, the radial rake angle (δ) has a negative value in the entire edge length region of the cutting edge (13) of the corner R. Further, the radial rake angle (δ) becomes a minimum value at the intermediate portion located between the pair of boundary points (P, Q) in the cutting edge (13) of the corner R.

In this way, since both of the radial rake angles (6) of the cutting edges (13) of the corner R of the pair of boundary points (P, Q) have negative values (negative angles), it is possible to sufficiently secure the edge tip strength of the cutting edge (13) of the corner R.

Meanwhile, for example, when either one or both of the radial rake angles (δ) of the cutting edges (13) of the corner R of the pair of boundary points (P, Q) are positive values (positive angles) differently from the embodiment, it is disadvantageous in that the strength of the cutting edge (13) of the corner R decreases.

Further, since the radial rake angle (δ) becomes a minimum value at the intermediate portion between the pair of boundary points (P, Q) of the cutting edge (13) of the corner R, the radial rake angle (δ) at the boundary point (P) between the cutting edge (13) of the corner R and the bottom cutting edge (11) at these boundary points (P, Q) can approach the positive angle side rather than the minimum value while having a negative value. Accordingly, it is possible to secure the sharpness of the boundary point (P) between the cutting edge (13) of the corner R and the bottom cutting edge (11) in bottom surface finish machining.

Further, the radial rake angle (δ) becomes smaller as it goes from the boundary point (P) between the cutting edge (13) of the corner R and the bottom cutting edge (11) in the cutting edge (13) of the corner R toward the boundary point (Q) between the cutting edge (13) of the corner R and the peripheral cutting edge (9) (specifically, toward the intermediate portion). That is, the radial rake angle (δ) becomes larger to the negative angle side as it goes toward the intermediate portion and becomes a minimum value (that is, a maximum value on the negative angle side) at the intermediate portion. Thus, since the intermediate portion located between the pair of boundary points (P, Q) is provided at the cutting edge boundary portion for cutting the processed hardened layer of the workpiece, the edge tip strength can be remarkably improved. For that reason, this is desirable in that the reliability of the cutting edge in bottom surface finish machining on a workpiece which is likely to undergo work hardening or a workpiece on which a work-affected layer may be formed due to machining with highly efficient conditions can be improved.

According to the above-described embodiments, when the bottom surface corresponding to the machining reference plane or the side surface perpendicular to the horizontal plane is formed on the workpiece such as a mold by finish machining, it is possible to improve the cutting performance particularly in the machining in which the tool protrusion length is long (for example, L/D is 4 or more) and thus to remarkably improve the dimensional accuracy in the finish machining of the side surface perpendicular to the horizontal plane in addition to the dimensional accuracy for finishing the bottom surface of the workpiece.

Further, in the embodiment, the radial rake angle (δ) of the cutting edge (13) of the corner R at the boundary point (P) between the cutting edge (13) of the corner R and the bottom cutting edge (11) is smaller than the radial rake angle (δ) of the cutting edge (13) of the corner R at the boundary point (Q) between the cutting edge (13) of the corner R and the peripheral cutting edge (9).

That is, since the radial rake angle (δ) of the cutting edge (13) of the corner R at the boundary point (P) between the cutting edge (13) of the corner R and the bottom cutting edge (11) becomes larger to the negative angle side than the radial rake angle (δ) of the cutting edge (13) of the corner R at the boundary point (Q) between the cutting edge (13) of the corner R and the peripheral cutting edge (9), it is possible to improve the fracture resistance of the bottom cutting edge (11) and to improve the chip discharge performance. As a result, it is possible to maintain a high quality in a finished surface.

Further, since the radial rake angle (δ) of the cutting edge (13) of the corner R at the boundary point (Q) between the cutting edge (13) of the corner R and the peripheral cutting edge (9) can approach the positive angle side while having a negative value, it is possible to reduce the cutting resistance (that is, the feed component force) in the tool radial direction (the horizontal direction) applied from the workpiece to the tool cutting the workpiece in side surface finish machining for machining the wall surface (the upright wall) perpendicular to the workpiece. Accordingly, since chattering vibration is reduced, the machining accuracy can be improved.

More specifically, for example, when the radial rake angle (δ) (the true rake angle) at the boundary point (P) between the cutting edge (13) of the corner R and the bottom cutting edge (11) is indicated by α, the radial rake angle (δ) (the true rake angle) at the boundary point (Q) between the cutting edge (13) of the corner R and the peripheral cutting edge (9) is indicated by β, and the minimum value of the radial rake angle (δ) (the true rake angle) at the intermediate portion is indicated by γ, the radial rake angle α, the radial rake angle β, and the radial rake angle γ all have negative values. Then, when the absolute values of the radial rake angles α, β, and γ are respectively indicated by |α|, |β|, and |γ|, a relationship of |γ|>|α|>|β| is obtained.

Since the indexable radius end mill (6) has the above-described configuration, in the bottom surface finish machining or side surface finish machining (in particular, the bottom surface finish machining), the radial rake angle (δ) of the cutting edge boundary portion (the intermediate portion located between the pair of boundary points P and Q) contacting the processed hardened layer of the workpiece in the previous rough machining or intermediate finish machining can be set to the smallest negative value.

Accordingly, it is desirable in that there is a significant effect of preventing chipping of the cutting edge boundary portion in the rough machining or intermediate finish machining.

Meanwhile, when the above-described relationship of |γ|>|α|>|β| is not obtained differently from the embodiment, the cutting edge boundary portion is easily damaged in the bottom surface finish machining or side surface finish machining (in particular, the bottom surface finish machining) in some cases.

Further, in the embodiment, since an angle in which the virtual straight line (VL) projected to the reference plane (Pr) is tilted with respect to the rotation center axis (C) in the reference plane (Pr) is defined as the radial angle (θ) and a point at which the radial rake angle (δ) becomes a minimum value is located in the region in which the radial angle (θ) becomes equal to or larger than 5° and equal to or smaller than 50° in the cutting edge (13) of the corner R, the following operational effects are obtained.

Since the indexable radius end mill (6) has the above-described configuration, it is possible to improve the edge tip strength of the cutting edge boundary portion for cutting the processed hardened layer of the workpiece (the intermediate portion located between the pair of boundary points P and Q) while securing the sharpness of the boundary point (P) between the cutting edge (13) of the corner R and the bottom cutting edge (11) in the bottom surface finish machining. For that reason, it is desirable in that the reliability of the cutting edge in the bottom surface finish machining on the workpiece which is likely to undergo work hardening or the workpiece on which a work-affected layer is formed due to the machining with highly efficient conditions can be improved.

Specifically, since the point in which the radial rake angle (δ) (the true rake angle) of the cutting edge (13) of the corner R becomes a minimum value is located in the region in which the radial angle (θ) on the cutting edge (13) of the corner R is 5° or more, it is possible to prevent deterioration in sharpness in the bottom surface finish machining. As a result, it is possible to remarkably improve the machining accuracy and to extend the tool life.

Further, since the point in which the radial rake angle (δ) (the true rake angle) of the cutting edge (13) of the corner R becomes a minimum value is located in the region in which the radial angle (θ) on the cutting edge (13) of the corner R is 50° or less, the cutting edge reinforced portion formed at this minimum value portion tends to fall within the range of the general bottom surface finishing allowance. Therefore, the effect of preventing chipping at the cutting edge boundary portion is remarkably obtained regardless of the bottom surface finishing allowance.

[Other Configurations Included in the Present Invention]

Additionally, the present invention is not limited to the above-described embodiments and can be modified into various forms in a range not departing from the spirit of the present invention.

For example, in the above-described embodiments, the minimum value of the radial rake angle (δ) is set be in a range of equal to or larger than 5° and equal to or smaller than 50° of the radial angle (θ) in the cutting edge (13) of the corner R, but the present invention is not limited thereto. That is, the minimum value of the radial rake angle (δ) may be set to be smaller than 5° or larger than 50° of the radial angle (θ).

In addition, the components (constituents) described in the embodiments, the modified examples, and further description above may be combined, added to, omitted, substituted, and otherwise modified in a range not departing from the spirit of the present invention. Further, the present invention is not limited to the above-described embodiments and is limited only to claims.

EXAMPLES

Hereinafter, the present invention will be described in detail using examples. However, the present invention is not limited to these examples.

[Manufacturing and Cutting Test of Indexable Radius End Mill]

First, as Example 1 of the present invention as an example of the present invention, the indexable radius end mill (6) of the above-described embodiment was prepared.

As the tool body (1), a carbide shank type having an edge diameter of φ20 mm, a shank diameter of φ20 mm, a total length of φ220 mm, a neck length of φ120 mm, and a neck diameter of φ19 mm was used.

The base material of the tool body (1) was made by using a base material obtained by bonding cemented carbide and a material equivalent to SKD61 with brazing filler metal, the outer shape was adjusted by lathe machining, and then the shank portion was finished by polishing.

In addition, the insert-fixing portion (the insert fit groove 7) of the mounting seat (3) was formed by milling at the machining center. As the securing screw (8) for attaching and detaching the insert (5), a screw size with a nominal diameter of M6 and a pitch of 0.75 mm was used.

The base material of the insert (5) was made of a WC-Co based cemented carbide and the coating film on the insert surface was subjected to a CrSi based nitride coating.

The shape of the insert (5) was a substantially planar shape as shown in FIG. 5, the R dimension of the cutting edge (13) of the corner R was 1 mm, the thickness dimension T shown in FIG. 8 was 5.2 mm, the length of the peripheral cutting edge (9) in the side view of the insert shown in FIG. 3 was 7 mm, and the axial rake angle (that is, the twist angle ε) of the peripheral cutting edge (9) in the side view of the insert was set to a positive value of 4°. Further, the radial rake angle of the peripheral cutting edge (9) (the rake angle when viewed from the direction orthogonal to the rotation center axis (C)) was set to 0.5°.

The bottom cutting edge (11) was tilted with respect to the horizontal plane passing through the boundary point (P) between the bottom cutting edge (11) and the cutting edge (13) of the corner R and perpendicular to the rotation center axis (C) to gradually extend toward the base end side in the direction of the rotation center axis (C) from the boundary point (P) toward the inner side in the radial direction and the positive middle/low inclination corresponding to the tilted angle was set to 3°.

The insert shape of Example 1 of the present invention is shown in FIG. 5. Further, main parameters showing the shape of the insert (5) of Example 1 of the present invention are shown in Table 1.

The insert (5) of Example 1 of the present invention included the chamfered surface (15) and the axial rake angle (Ar1) at the position of the boundary point (Q) of the cutting edge (13) of the corner R and the axial rake angle (Ar2) of the cutting edge (13) of the corner R at the position of the boundary point (P) were set to the same negative value of −6.8°.

Here, as described above, the boundary point (Q) shown in FIG. 9 is the boundary point between the cutting edge (13) of the corner R and the peripheral cutting edge (9) and is also the outermost peripheral point of the peripheral cutting edge (9) in the rotation trajectory of the cutting edge around the rotation center axis (C). Such a theoretical (ideal) boundary point (Q) is a point in which the radial angle (θ) becomes 90° in the cutting edge (13) of the corner R.

However, at the time of actually grinding the chamfered surface (15) in the manufacture of the insert (5), the point E corresponding to the actual boundary point (Q) is formed at any part in a predetermined region (S) from the front end part of the region in which the peripheral cutting edge (9) is to be formed (the region in which the peripheral cutting edge (9) is to be formed in theory) to the base end portion of the region in which the cutting edge (13) of the corner R is to be formed (the region in which the cutting edge 13 of the corner R is to be formed in theory). That is, the position of the point E which is the actual boundary point (Q) may be slightly displaced from the theoretical boundary point (Q) due to manufacturing circumstances and the like.

In such a case, it is desirable to dispose the position of the point E at the region in which the cutting edge (13) of the corner R is to be formed in relation to the region in which the peripheral cutting edge (9) is to be formed with respect to the theoretical boundary point (Q). As a result, it is possible to reliably prevent a problem in which the tool diameter decreases. Further, in this case, it is desirable to set the angle (the central angle) between the theoretical boundary point (Q) and the point E (the actual boundary point Q) centered on the arc center point (O) within 2°.

In view of the description above, in Example 1 of the present invention, the insert (5) was manufactured so that the point E corresponding to the actual boundary point (Q) was disposed in the range of 2° or less of the central angle directed to the region to be formed in the cutting edge (13) of the corner R from the theoretical boundary point (Q).

Further, in FIG. 6, the point F existing in the bottom cutting edge region (U) was set to a position separated by 2.5 mm from a straight line passing through the boundary point (Q) and parallel to the rotation center axis (C).

Further, the profile of the radial rake angle (δ) in the cutting edge (13) of the corner R of Example 1 of the present invention is shown in FIG. 11. From FIG. 11, the radial rake angle (δ) had a minimum value at a position in which the radial angle (θ) was 20°. The radial rake angle (δ) at this time was −7.2°.

Further, a schematic diagram of a cross-section of the cutting edge at the radial angle (θ) of 40° of the cutting edge (13) of the corner R of Example 1 of the present invention is shown in FIG. 10 (a right lower diagram of FIG. 10). An example in which the radial rake angle (δ) is −6.6° at the radial angle (θ) of 40° is shown.

Additionally, in Table 1, when the radial angle (θ) is 0°, the radial rake angle (δ) of (the boundary point P) is indicated by a value α. Then, when the radial angle (θ) is 90°, the radial rake angle (δ) of (the boundary point Q) is indicated by a value β and the minimum value of the radial rake angle (δ) is indicated by a value γ.

Figure 12:
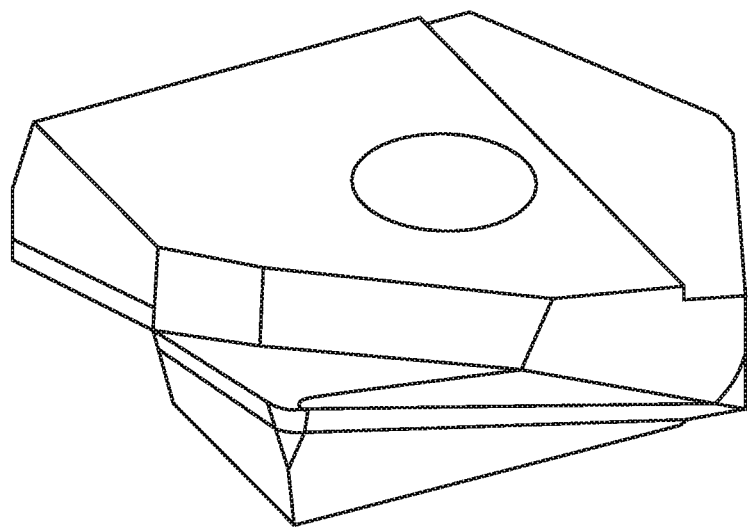
FIG. 12 shows an insert shape of Comparative Example 2.
Figure 13:
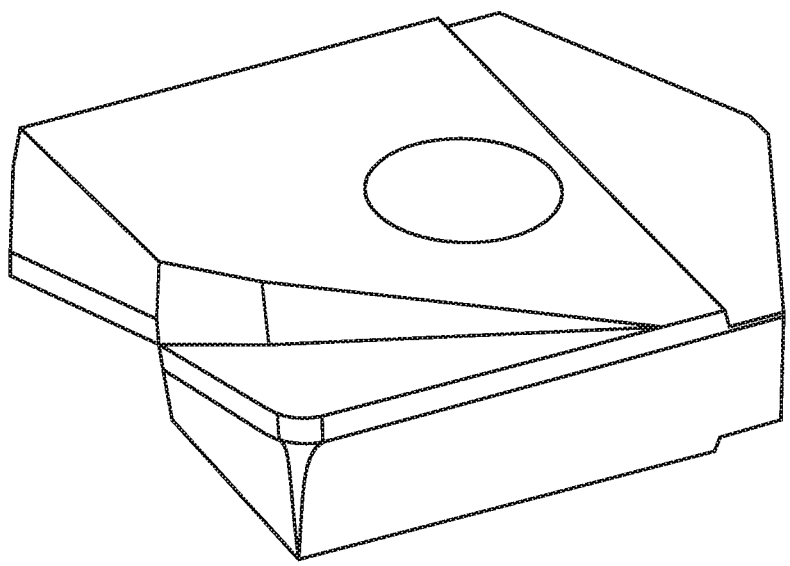
FIG. 13 shows an insert shape of Comparative Example 3.

Further, inserts of comparative examples having different technical ideas from the present invention were prepared. The insert shape of Comparative Example 2 is shown in FIG. 12 and the insert shape of Comparative Example 3 is shown in FIG. 13. Further, main parameters showing the shapes of the inserts of Comparative Example 2 and Comparative Example 3 are also shown in Table 1. The inserts of the comparative examples were manufactured using the same material and had substantially the same shapes as that of the insert of Example 1 of the present invention. However, since the comparative examples did not have the particular configuration of the present invention and particularly did not have the chamfered surface of the cutting edge of the corner R, the specification of the cutting edge of the corner R was different from that of the present invention.

In Comparative Example 3, the rake face of the bottom cutting edge, the rake face of the cutting edge of the corner R, and the rake face of the peripheral cutting edge were formed on the same plane and the axial rake angle was set to 0°. Further, the rake face of the bottom cutting edge and the rake face of the cutting edge of the corner R were formed on the same plane as the chip discharge groove extending to the base end side of the rake face of the bottom cutting edge. Further, the true rake angle of the peripheral cutting edge was set to a negative value.

The inserts of Example 1 of the present invention, Comparative Example 2, and Comparative Example 3 manufactured in this way were attached to the tool body of the indexable radius end mill and the cutting evaluation was performed. After attaching the tool body to which each insert was attached to the chuck as a tool-holding tool, the tool body was attached to the spindle of the milling machine. Contour finish machining of the upright wall side surface portion was performed by using the following cutting conditions with different cutting speeds (Vc). The tilting accuracy of the upright wall side surface portion of the workpiece formed at that time was measured by using a shape-measuring machine. The measurement results of the tilting accuracy of the side surface portion are shown in Table 1.

As for the tilting accuracy mentioned herein, when comparing the shape profile line and the vertical line of the upright wall side surface portion of the workpiece with reference to the apex of the upright wall side surface portion of the workpiece as a reference, the maximum value of the deviation dimension between them is defined as the tilting accuracy (μm). That is, a case in which the shape profile line is aligned with the vertical line means a case in which ideal machining can be performed. The shape profile line of the upright wall side surface portion for each cutting speed (Vc) is shown in FIGS. 14 to 19.

For the experiment, S55C material was used as the material of the workpiece and the dimensions were 60×60×30 (mm). This side shoulder milling was performed to form the upright wall side surface portion at a depth of 20 mm from the upper surface portion. As the tilting accuracy measurement position, a position 10 mm from the upper surface was set to the center and a position 18 mm therefrom was set as the bottom portion.

<Cutting Conditions>
Workpiece: carbon steel S55C (for plastic mold)
Workpiece hardness: 220 HB (Brinell hardness)
Cutting speed (Vc): 100 m/minute, 200 m/minute
Rotation speed (n) of spindle: 1592 rotations/minute, 3184 rotations/minute
Feed per each edge (fz): 0.15 mm (constant)
Table feed (Vf): 478 mm/minute, 955 mm/minute
Axial cut depth (ap): 1 mm (constant)
Radial cut width (ae): 0.1 mm (constant)
Tool protrusion: 140 mm
Machining method: dry type, contour finish machining of upright wall side surface portion

TABLE 1

|  |  |  | Example 1 of the present invention | Comparative Example 1 | Comparative Example 2 |
|---|---|---|---|---|---|
| EDGE DIAMETER (mm) |  |  | 20 | 20 | 20 |
| THICKNESS (mm) OF INSERT |  |  | 5.2 | 5.2 | 5.2 |
| EDGE LENGTH (mm) |  |  | 7 | 7 | 7 |
| AXIAL RAKE ANGLE (°) OF PERIPHERAL CUTTING EDGE |  |  | 4 | 4 | 0 |
| RADIAL RAKE ANGLE (°) OF PERIPHERAL CUTTING EDGE |  |  | 0.5 | 0.5 | 1 |
| MIDDLE/LOW INCLINATION ANGLE (°) |  |  | 1 | 3 | 1 |
| DIMENSION (mm) OF CORNER R |  |  | 1 | 1 | 1 |
| AXIAL RAKE ANGLE Ar1 (°) OF CUTTING EDGE OF CORNER R |  |  | −6.8 | 4 | 0 |
| AXIAL RAKE ANGLE Ar2 (°) OF CUTTING EDGE OF CORNER R |  |  | −6.8 | 4 | 0 |
| CHAMFERED SURFACE |  |  | YES | NO | NO |
| RADIAL RAKE ANGLE α (°) OF CUTTING EDGE OF CORNER R |  |  | −6.8 | 0 | 0 |
| RADIAL RAKE ANGLE β (°) OF CUTTING EDGE OF CORNER R |  |  | −2.2 | 0 | 0 |
| RADIAL RAKE ANGLE γ (°) OF CUTTING EDGE OF CORNER R |  |  | −7.2 | 0 | 0 |
| TILTING ACCURACY (μm) OF UPRIGHT WALL SIDE SURFACE PORTION | Vc: 100 (m/min) | CENTER | 5 | 5 | 10 |
|  |  | BOTTOM | 5 | 12.5 | 15 |
|  | Vc: 200 (m/min) | CENTER | 5 | 7.5 | 17.5 |
|  |  | BOTTOM | 5 | 12.5 | 27.5 |

Table 1 shows the evaluation results obtained by measuring the tilting accuracy of the upright wall side surface portion of the workpiece of each of the inserts of Example 1 of the present invention, Comparative Example 2, and Comparative Example 3.

When the cutting speed condition (the Vc value) was 100 m/minute, Example 1 of the present invention with the chamfered surface showed a satisfactory result in which the tilting accuracy was 5 (μm). Also when the cutting speed condition (the Vc value) was 200 m/minute as a highly efficient condition, it was found that Example 1 of the present invention had a satisfactory result in which the tilting accuracy was 5 (μm).

In Example 1 of the present invention, since the axial rake angle (Ar1) of the cutting edge (13) of the corner R at the position of the boundary point (Q) was set to a negative angle and the axial rake angle (the twist angle ε) of the peripheral cutting edge (9) was set to a positive angle, biting of the peripheral cutting edge (9) and the cutting edge (13) of the corner R into the workpiece started by point-contact and thus chattering vibration was reduced. Accordingly, it is considered that machining was performed stably.

Meanwhile, in Comparative Example, since the cutting speed condition (Vc value) was 100 m/minute, Comparative Example 2 had a result that the tilting accuracy was 5 to 12.5 (μm) and Comparative Example 3 had a result that the tilting accuracy was 10 to 15 (μm). Further, when the condition of the cutting speed (the Vc value) was 200 m/minute as a highly efficient condition, Comparative Example 2 showed a result that the tilting accuracy was 7.5 to 12.5 (μm) and Comparative Example 3 showed a result that the tilting accuracy was 17.5 to 27.5 (μm). From these results, in the comparative examples, it was found that the tilting accuracy deteriorated when the cutting conditions were highly efficient conditions.

The reason for this is because the biting started by line-contact as the axial rake angle of the cutting edge of the corner R entering the workpiece is the same as the axial rake angle (the twist angle) of the peripheral cutting edge. Accordingly, the likelihood of causing chattering vibration increases.

Figure 14:
FIG. 14 shows a shape profile line of an upright wall side surface portion formed by machining using an insert of Example 1 of the present invention.
Figure 15:
FIG. 15 shows a shape profile line of an upright wall side surface portion formed by machining using an insert of Comparative Example 2.
Figure 16:
FIG. 16 shows a shape profile line of an upright wall side surface portion formed by machining using an insert of Comparative Example 3.
Figure 17:
FIG. 17 shows a shape profile line of an upright wall side surface portion formed by machining using the insert of Example 1 of the present invention.
Figure 18:
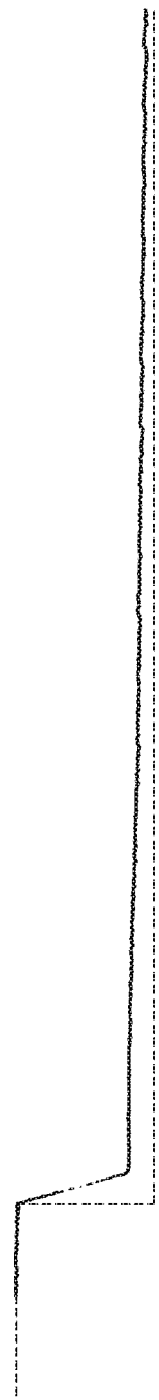
FIG. 18 shows a shape profile line of an upright wall side surface portion formed by machining using the insert of Comparative Example 2.
Figure 19:
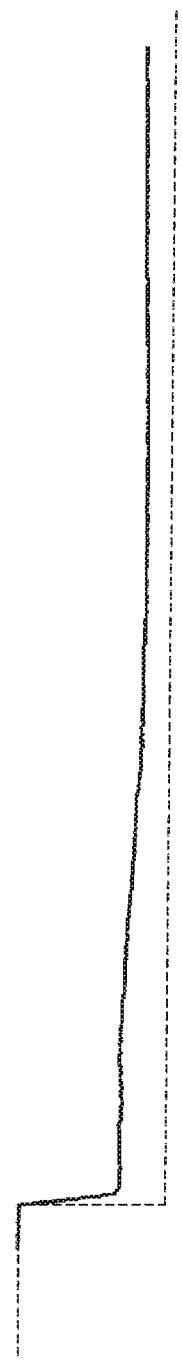
FIG. 19 shows a shape profile line of an upright wall side surface portion formed by machining using the insert of Comparative Example 3.

Further, the shape profile lines of the upright wall side surface portions formed by machining the inserts of Example 1 of the present invention, Comparative Example 2, and Comparative Example 3 are shown in FIGS. 14 to 19. FIGS. 14 to 16 show the shape profile line when the cutting speed (the Vc value) was 100 m/minute and FIGS. 17 to 19 show the shape profile line when the cutting speed (the Vc value) was 200 m/minute. In these drawings, the dotted line indicates the horizontal line and the vertical line corresponding to the bottom surface and the surface perpendicular to the horizontal plane to be machined and the solid line indicates the shape profile line.

In the upright wall side surface portions formed by machining using the inserts of Comparative Examples 2 and 3, it was found that the deviation from the vertical line increased moving toward the bottom portion and this tendency became significant as the cutting speed increased. On the contrary, in the upright wall side surface portion formed by machining using the insert of Example 1 of the present invention, it was observed that a constant deviation from the vertical line was maintained from the upper portion to the bottom portion and a surface perpendicular to the horizontal plane was formed.

In addition to a cemented carbide containing tungsten carbide (WC) and cobalt (Co), the materials of the base of the insert (5) according to Example 1 of the present invention may be, for example, cermet, high-speed steel, titanium carbide, silicon carbide, silicon nitride, aluminum nitride, aluminum oxide, ceramics composed of a mixture thereof, a cubic boron nitride sintered substance, a diamond sintered body, hard-phase materials composed of polycrystalline diamond or cubic boron nitride, and an ultra-high pressure sintered body obtained by firing binder-phase materials such as ceramics and iron group metals under an ultra-high pressure.

When the tool main body (1) and the shank portion according to Example 1 of the present invention are manufactured, for example, using alloy tool steel such as SKD 61, a carbide shank type can be used in which the tool body (1) is made of alloy tool steel such as SKD 61, the shank portion is made of cemented carbide, and the shank portion is joined to the tool body (1).

INDUSTRIAL APPLICABILITY

According to the indexable rotary cutting tool and the insert of the present invention, it is possible to improve not only the finished dimensional accuracy of the bottom surface of the workpiece but also the dimensional accuracy in vertical side finish machining.

REFERENCE SIGNS LIST

1: Tool body
2: Front end part
3: Mounting seat
4: Cutting edge portion
5: Insert
6: Indexable radius end mill (indexable rotary cutting tool)
7: Insert fit groove
8: Securing screw
9: Peripheral cutting edge
10: Rake face of peripheral cutting edge
11: Bottom cutting edge
12: Rake face of bottom cutting edge
13: Cutting edge of corner R
14: Rake face of cutting edge of corner R
15: Chamfered surface
16, 17: Chip discharge groove
A: Predetermined point on cutting edge of corner R
Ar1, Ar2: Axial rake angle (axial rake)
C: Rotation center axis
O: Arc center point
P, Q: Boundary point
Pr: Reference plane
VL: Virtual straight line
VS: Virtual plane
$\delta$: Radial rake angle (true rake angle)
$\varepsilon$: Twist angle
$\theta$: Radiation angle

The invention claimed is:

1. An indexable rotary cutting tool (6) comprising: a tool body (1); and an insert (5) having a cutting edge portion (4), the insert (5) being separably attached to a mounting seat (3) provided in a front end part (2) of the tool body (1), wherein the mounting seat (3) comprises:
a slit-shaped insert fit groove (7) which is formed at the front end part (2) of the tool body (1) to extend in a radial direction orthogonal to a rotation center axis (C) of the tool and including the rotation center axis (C); and
a securing screw (8) configured to fix the insert (5) inserted into the insert fit groove (7), wherein the cutting edge portion (4) of the insert (5) comprises:
a peripheral cutting edge (9) which extends along the direction of the rotation center axis (C);
a rake face (10) of the peripheral cutting edge (9);
a bottom cutting edge (11) which extends along the radial direction;
a rake face (12) of the bottom cutting edge (11);
a cutting edge (13) of a corner R which connects an outer end of the bottom cutting edge (11) in the radial direction and a front end of the peripheral cutting edge (9) in the direction of the rotation center axis (C) and is formed in an arc shape to protrude toward an outer peripheral side of the front end of the tool body (1);
a rake face (14) of the cutting edge (13) of the corner R;
a chamfered surface (15) which includes at least a portion located at an outer side in the radial direction of the rake face (14) of the cutting edge (13) of the corner R or the rake face (12) of the bottom cutting edge (11);
a chip discharge groove (16) which is formed at a base end side of the rake face (12) of the bottom cutting edge (11) in the direction of the rotation center axis (C); and
a chip discharge groove (17) which is formed at an inside of the rake face (10) of the peripheral cutting edge (9) in the radial direction, wherein a twist angle ($\varepsilon$) of the peripheral cutting edge (9) has a positive value, wherein an axial rake angle (Ar1) of the cutting edge (13) of the corner R at a boundary point (Q) between the cutting edge (13) of the corner R and the peripheral cutting edge (9) has a negative value, wherein an axial rake angle (Ar2) of the cutting edge (13) of the corner R at a boundary point (P) between the cutting edge (13) of the corner R and the bottom cutting edge (11) has a negative value,
wherein in a virtual plane (VS), which is perpendicular to a reference plane (Pr) including the rotation center axis (C) and a predetermined point (A) on the cutting edge (13) of the corner R and includes a virtual straight line (VL) passing through the predetermined point (A) and an arc center point (O) of the cutting edge (13) of the corner R, a true rake angle corresponding to an angle in which the rake face (14) of the cutting edge (13) of the corner R is tilted with respect to the reference plane (Pr) is defined as a radial rake angle (δ),
wherein the radial rake angle (δ) of the cutting edge (13) of the corner R has a negative value in an entire edge length region of the cutting edge (13) of the corner R, and
wherein the radial rake angle (δ) has a minimum value at an intermediate portion located between the pair of boundary points (P, Q) in the cutting edge (13) of the corner R.

2. The indexable rotary cutting tool (6) according to claim 1,
wherein the radial rake angle (δ) of the cutting edge (13) of the corner R at the boundary point (P) between the cutting edge (13) of the corner R and the bottom cutting edge (11) is smaller than the radial rake angle (δ) of the cutting edge (13) of the corner R at the boundary point (Q) between the cutting edge (13) of the corner R and the peripheral cutting edge (9).

3. The indexable rotary cutting tool (6) according to claim 1,
wherein an angle in which the virtual straight line (VL) projected to the reference plane (Pr) is tilted with respect to the rotation center axis (C) within the reference plane (Pr) is defined as a radial angle (θ), and
wherein the minimum value of the radial rake angle (δ) is set to be in a range of equal to or larger than 5° and equal to or smaller than 50° of the radial angle (θ) in the cutting edge (13) of the corner R.

4. An insert (5) used in the indexable rotary cutting tool (6) according to claim 1.

5. The indexable rotary cutting tool (6) according to claim 2,
wherein an angle in which the virtual straight line (VL) projected to the reference plane (Pr) is tilted with respect to the rotation center axis (C) within the reference plane (Pr) is defined as a radial angle (θ), and
wherein the minimum value of the radial rake angle (δ) is set to be in a range of equal to or larger than 5° and equal to or smaller than 50° of the radial angle (θ) in the cutting edge (13) of the corner R.

6. An insert (5) used in the indexable rotary cutting tool (6) according to claim 2.

7. An insert (5) used in the indexable rotary cutting tool (6) according to claim 3.

8. An insert (5) used in the indexable rotary cutting tool (6) according to claim 5.

* * * * *